US011010105B2

(12) United States Patent
Kaneda

(10) Patent No.: US 11,010,105 B2
(45) Date of Patent: May 18, 2021

(54) PRINT SYSTEM, PRINTING APPARATUS AND METHOD OF CONTROLLING THE SAME, AND STORAGE MEDIUM

(71) Applicant: CANON KABUSHIKI KAISHA, Tokyo (JP)

(72) Inventor: Takeshi Kaneda, Funabashi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/360,679

(22) Filed: Mar. 21, 2019

(65) Prior Publication Data

US 2019/0303054 A1 Oct. 3, 2019

(30) Foreign Application Priority Data

Mar. 27, 2018 (JP) .............................. JP2018-060742

(51) Int. Cl.
*G06F 3/12* (2006.01)

(52) U.S. Cl.
CPC .......... *G06F 3/1205* (2013.01); *G06F 3/1228* (2013.01); *G06F 3/1232* (2013.01); *G06F 3/1255* (2013.01); *G06F 3/1285* (2013.01); *G06F 3/1286* (2013.01); *G06F 3/1292* (2013.01); *G06F 3/1294* (2013.01)

(58) Field of Classification Search
None
See application file for complete search history.

(56) References Cited

U.S. PATENT DOCUMENTS

| 2005/0097229 | A1 | 5/2005 | Saito et al. |
| 2012/0120445 | A1* | 5/2012 | Kuroshima ........... G06F 3/1205 358/1.15 |
| 2012/0147404 | A1* | 6/2012 | Kubota .................. G06F 3/1208 358/1.13 |
| 2018/0174004 | A1 | 6/2018 | Kaneda |

OTHER PUBLICATIONS

European Search Report dated Jan. 9, 2020, in related European Patent Application No. 19161496.5.
T. Hastings, et al., "Internet Printing Protocol / 1.1: Model and Semantics," Network Working Group, Sep. 2000, pp. 1-224.
"IPP: Job and Printer Extensions—Set 3 (JPS3)," The Printer Working Group, Jul. 27, 2012, pp. 1-86.

* cited by examiner

*Primary Examiner* — Andrew H Lam
(74) *Attorney, Agent, or Firm* — Venable LLP

(57) ABSTRACT

A printing apparatus receives a request for combinations of print settings that conflict with each other and information related to an information processing apparatus from the information processing apparatus, notifies the information processing apparatus of one or more combinations obtained by narrowing down, based on the received information, the stored plurality of combinations of print settings that conflict with each other, and receives print settings from the information processing apparatus. In addition, it is determined whether or not the received print settings include print settings that conflict with each other, based on at least one combination that is combinations stored in the one or more memories and different from the notified one or more combinations.

19 Claims, 34 Drawing Sheets

```
"Hyptertext Transfer Protocol"
POST /ipp/print HTTP/1.1/
Content-Length : XXX
Content-Type : application/ipp
Host :AbcXXXX.local:631
```

User-Agent : CUPS/2.2.3 (XXXOS Version11.0)  ～601

```
  Expect : 100-continue
"Internet Printing Protocol"
Request = {
  operation-id: Get-Printer-Attributes
  operation-attributes-tag = {
    "attributes-charset" = "utf-8",
    "attributes-natural-language" = "ja-jp",
    "printer-uri" = "ipp://xxxx.local.:631/ipp/print",
  "client-attributes" = {                                    ～602
    "job-constraints-update-supported" = "true",    ～606
    "constraints-items-max" = "2",                          ～603
    "constraints-support-function" = {                      ～604
      "media-size" : {'iso_a5_148x210mm' , 'iso_a4_210x297mm' , 'iso_a3_297x420mm'}
      "sides" = {one-sided, double-sided-longedge, double-sided-short-edge},
      "finishings" = {
        staple, staple-top-left
      }
    }
  }
  "requested-attributes (keyword) : "job-constraints-supported" ,    ～605
}
```

```
"Hypertext Transport Protocol"
HTTP/1.1 200 OK
Server : ABC HTTP Server
Content-Length : XXX
Content-Type : application/ipp
Connection : close "Internet Printing Protocol"
Response = {
  operation-attributes-tag = {
    "attributes-charset" = "utf-8",
    "attributes-natural-language" = "ja-jp",
  },
  printer-attributes-tag {                              ～611
    job-constraints-supported={                          ～612
      resolver-name="rule01"
      sides={
        "double-sided-long-edge"
        "double-sided-short-edge"
      },
      media-col={
        media-size="iso_a5_148x210mm"
      }
    }
  },
  end-of-attribute-tag
}                                                        ～610
```

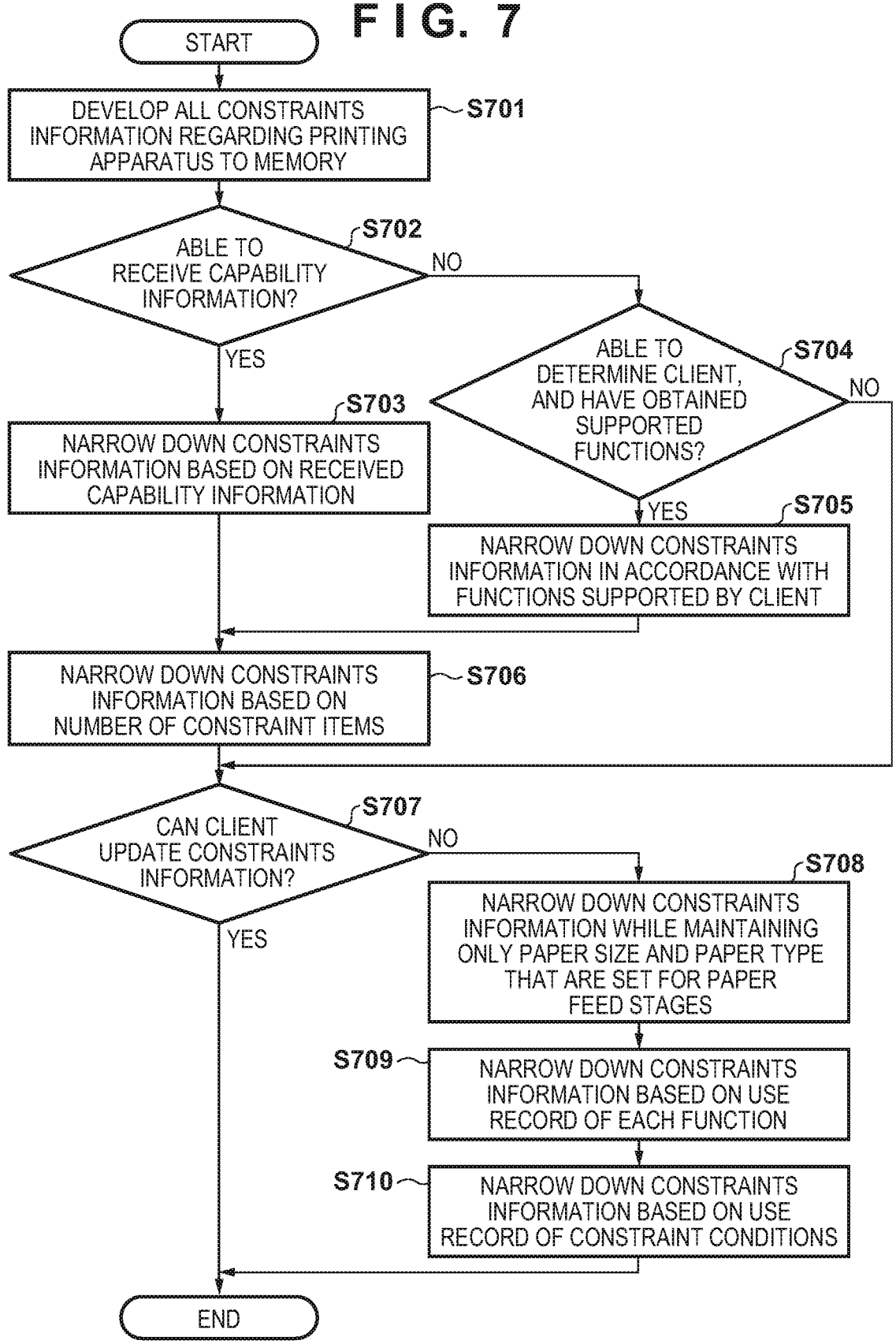

FIG. 8A

| MANAGE-MENT NUMBER (A) | CONSTRAINT RECORD (CONSTRAINT UNIT) (B) | NUMBER OF CONSTRAINT ITEMS (CONSTRAINT UNIT) (C) | VALIDITY (D) | RULE DESCRIPTION (E) |
|---|---|---|---|---|
| 1 | 0 | 2 | T | DOUBLE-SIDED PRINTING ON A5 UNAVAILABLE |
| 2 | 0 | 2 | T | DOUBLE-SIDED PRINTING ON THICK PAPER UNAVAILABLE |
| 3 | 0 | 2 | T | PUNCHING AT ANY POSITION ON A5 PAPER UNAVAILABLE |
| 4 | 0 | 2 | T | PUNCHING AT LEFT POSITION ON A5 PAPER UNAVAILABLE |
| 5 | 0 | 2 | T | PUNCHING AT LOWER POSITION ON A5 PAPER UNAVAILABLE |
| 6 | 0 | 2 | T | PUNCHING AT RIGHT POSITION ON A5 PAPER UNAVAILABLE |
| 7 | 0 | 2 | T | PUNCHING AT UPPER POSITION ON A5 PAPER UNAVAILABLE |
| 8 | 0 | 2 | T | STAPLING AT ANY POSITION ON A5 PAPER UNAVAILABLE |
| 9 | 0 | 2 | T | STAPLING AT LEFT POSITION ON A5 PAPER UNAVAILABLE |
| 10 | 0 | 2 | T | STAPLING AT LOWER POSITION ON A5 PAPER UNAVAILABLE |
| 11 | 0 | 2 | T | STAPLING AT RIGHT POSITION ON A5 PAPER UNAVAILABLE |
| 12 | 0 | 2 | T | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | T | STAPLING AT LOWER LEFT POSITION ON A5 PAPER UNAVAILABLE |
| 15 | 0 | 2 | T | STAPLING AT LOWER RIGHT POSITION ON A5 PAPER UNAVAILABLE |
| 16 | 0 | 2 | T | STAPLING AT UPPER RIGHT POSITION ON A5 PAPER UNAVAILABLE |
| 17 | 0 | 2 | T | STAPLING AT ANY POSITION ON THICK PAPER UNAVAILABLE |
| 18 | 0 | 2 | T | STAPLING AT LEFT POSITION ON THICK PAPER UNAVAILABLE |
| 19 | 0 | 2 | T | STAPLING AT LOWER POSITION ON THICK PAPER UNAVAILABLE |
| 20 | 0 | 2 | T | STAPLING AT RIGHT POSITION ON THICK PAPER UNAVAILABLE |
| 21 | 0 | 2 | T | STAPLING AT UPPER POSITION ON THICK PAPER UNAVAILABLE |
| 22 | 0 | 2 | T | STAPLING AT UPPER LEFT POSITION ON THICK PAPER UNAVAILABLE |
| 23 | 0 | 2 | T | STAPLING AT LOWER LEFT POSITION ON THICK PAPER UNAVAILABLE |
| 24 | 0 | 2 | T | STAPLING AT LOWER RIGHT POSITION ON THICK PAPER UNAVAILABLE |
| 25 | 0 | 2 | T | STAPLING AT UPPER RIGHT POSITION ON THICK PAPER UNAVAILABLE |
| 26 | 10 | 3 | T | STAPLING AT LEFT POSITION ON A3 PLAIN PAPER UNAVAILABLE |
| 27 | 1 | 3 | T | STAPLING AT RIGHT POSITION ON A3 PLAIN PAPER UNAVAILABLE |
| 28 | 2 | 2 | T | PUNCHING AT LEFT POSITION ON A3 PAPER UNAVAILABLE |
| 29 | 0 | 2 | T | PUNCHING AT RIGHT POSITION ON A3 PAPER UNAVAILABLE |

FIG. 8B

| A | F | G | H | I | J | K | L | M | N | O | P |
|---|---|---|---|---|---|---|---|---|---|---|---|
| MANAGE-MENT NUMBER | PAPER TYPE | | | PAPER SIZE | | | STAPLING | | | | |
| | ANY | PLAIN PAPER | THICK PAPER | A5 | A4 | A3 | ANY | LEFT | LOWER | RIGHT | UPPER |
| | 99 | 23 | 0 | 0 | 121 | 10 | 0 | 5 | 5 | 0 | 0 |
| 1 | F | F | F | T | F | F | F | F | F | F | F |
| 2 | F | F | T | F | F | F | F | F | F | F | F |
| 3 | F | F | F | T | F | F | F | F | F | F | F |
| 4 | F | F | F | T | F | F | F | F | F | F | F |
| 5 | F | F | F | T | F | F | F | F | F | F | F |
| 6 | F | F | F | T | F | F | F | F | F | F | F |
| 7 | F | F | F | T | F | F | F | F | F | F | F |
| 8 | F | F | F | T | F | F | T | F | F | F | F |
| 9 | F | F | F | T | F | F | F | T | F | F | F |
| 10 | F | F | F | T | F | F | F | F | T | F | F |
| 11 | F | F | F | T | F | F | F | F | F | T | F |
| 12 | F | F | F | T | F | F | F | F | F | F | T |
| 13 | F | F | F | T | F | F | F | F | F | F | F |
| 14 | F | F | F | T | F | F | F | F | F | F | F |
| 15 | F | F | F | T | F | F | F | F | F | F | F |
| 16 | F | F | F | T | F | F | F | F | F | F | F |
| 17 | F | F | T | F | F | F | T | F | F | F | F |
| 18 | F | F | T | F | F | F | F | T | F | F | F |
| 19 | F | F | T | F | F | F | F | F | T | F | F |
| 20 | F | F | T | F | F | F | F | F | F | T | F |
| 21 | F | F | T | F | F | F | F | F | F | F | T |
| 22 | F | F | T | F | F | F | F | F | F | F | F |
| 23 | F | F | T | F | F | F | F | F | F | F | F |
| 24 | F | F | T | F | F | F | F | F | F | F | F |
| 25 | F | F | T | F | F | F | F | F | F | F | F |
| 26 | F | T | F | F | F | T | F | T | F | F | F |
| 27 | F | T | F | F | F | T | F | F | F | T | F |
| 28 | F | F | F | F | F | T | F | F | F | F | F |
| 29 | F | F | F | F | F | T | F | F | F | F | F |

FIG. 8C

| A | Q | R | S | T | U | V | W | X | Y | Z |
|---|---|---|---|---|---|---|---|---|---|---|
| | STAPLING | | | | PUNCHING (TWO HOLES) | | | | | DOUBLE-SIDED PRINTING |
| MANAGEMENT NUMBER | UPPER LEFT | LOWER LEFT | LOWER RIGHT | UPPER RIGHT | ANY | LEFT | LOWER | RIGHT | UPPER | |
| | 35 | 10 | 0 | 0 | 0 | 15 | 5 | 0 | 0 | 45 |
| 1 | F | F | F | F | F | F | F | F | F | T |
| 2 | F | F | F | F | F | F | F | F | F | T |
| 3 | F | F | F | F | T | F | F | F | F | F |
| 4 | F | F | F | F | F | T | F | F | F | F |
| 5 | F | F | F | F | F | F | T | F | F | F |
| 6 | F | F | F | F | F | F | F | T | F | F |
| 7 | F | F | F | F | F | F | F | F | T | F |
| 8 | F | F | F | F | F | F | F | F | F | F |
| 9 | F | F | F | F | F | F | F | F | F | F |
| 10 | F | F | F | F | F | F | F | F | F | F |
| 11 | F | F | F | F | F | F | F | F | F | F |
| 12 | F | F | F | F | F | F | F | F | F | F |
| 13 | T | F | F | F | F | F | F | F | F | F |
| 14 | F | T | F | F | F | F | F | F | F | F |
| 15 | F | F | T | F | F | F | F | F | F | F |
| 16 | F | F | F | T | F | F | F | F | F | F |
| 17 | F | F | F | F | F | F | F | F | F | F |
| 18 | F | F | F | F | F | F | F | F | F | F |
| 19 | F | F | F | F | F | F | F | F | F | F |
| 20 | F | F | F | F | F | F | F | F | F | F |
| 21 | F | F | F | F | F | F | F | F | F | F |
| 22 | T | F | F | F | F | F | F | F | F | F |
| 23 | F | T | F | F | F | F | F | F | F | F |
| 24 | F | F | T | F | F | F | F | F | F | F |
| 25 | F | F | F | T | F | F | F | F | F | F |
| 26 | F | F | F | F | F | F | F | F | F | F |
| 27 | F | F | F | F | F | F | F | F | F | F |
| 28 | F | F | F | F | F | T | F | F | F | F |
| 29 | F | F | F | F | F | F | F | T | F | F |

FIG. 8D

| USE RECORD OF EACH FUNCTION OF PRINTING APPARATUS | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|
| | PAPER TYPE | | | PAPER SIZE | | | STAPLING | | | | | | | | PUNCHING(TWO HOLES) | | | | | DOUBLE-SIDED PRINTING |
| | ANY | PP | TP | A5 | A4 | A3 | ANY | L | LOW-ER | R | UP-PER | UL | LOW L | LOW R | UR | ANY | L | LOW-ER | R | UP-PER | |
| COUNTER | 99 | 23 | 0 | 0 | 121 | 10 | 0 | 5 | 5 | 0 | 0 | 35 | 10 | 0 | 0 | 0 | 15 | 5 | 0 | 0 | 45 |

FIG. 9

| A | B | C | D | E | F | G | H | I | J | K | L | M | N | O | P | Q | R | S | T | U | V | W | X |
|---|---|---|---|---|---|---|---|---|---|---|---|---|---|---|---|---|---|---|---|---|---|---|---|
| UserAgent | PAPER TYPE | | | PAPER SIZE | | | | STAPLING | | | | | | | | PUNCHING(TWO HOLES) | | | | | DOUBLE-SIDED PRINTING | MAXIMUM NUMBER OF CONSTRAINT ITEMS | UPDATING OF CONSTRAINTS INFORMATION |
| | ANY | PP | TP | A3 | A4 | A5 | ANY | L | LOW-ER | R | UP-PER | UL | LOW L | LOW R | UR | ANY | L | LOW-ER | R | UP-PER | | | |
| XXXOS Version12.3 | F | F | F | F | F | F | T | F | F | F | F | F | F | F | F | T | T | F | F | F | T | 3 | T |
| XXXOS Version12.2 | F | F | F | F | F | F | T | F | F | F | F | F | F | F | F | T | T | F | F | F | T | 3 | T |
| XXXOS Version12.1 | F | F | F | F | F | F | T | F | F | F | F | F | F | F | F | T | T | F | F | F | T | 2 | T |
| XXXOS Version12.0 | F | F | F | F | F | F | T | F | F | F | F | F | F | F | F | T | T | F | F | F | T | 2 | T |
| XXXOS Version11.0 | F | F | F | F | F | F | T | F | F | F | F | F | F | F | F | T | F | F | F | F | T | 2 | T |
| YYYOS Version5.1 | T | T | T | T | T | T | T | F | F | F | F | F | F | F | F | T | T | F | F | F | T | 2 | T |
| YYYOS Version5.0 | T | T | T | T | T | T | T | F | F | F | F | F | F | F | F | T | F | F | F | F | T | 2 | T |
| YYYOS Version4.2 | T | T | T | T | T | T | T | F | F | F | F | F | F | F | F | F | F | F | F | F | T | 0 | T |
| YYYOS Version4.1 | T | T | T | T | T | T | T | F | F | F | F | F | F | F | F | F | F | F | F | F | T | 0 | T |
| YYYOS Version4.0 | T | T | T | T | T | T | T | F | F | F | F | F | F | F | F | F | F | F | F | F | T | 0 | T |
| ZZZOS Version8.0 | T | T | T | T | T | T | T | T | T | T | T | T | T | T | T | T | T | T | T | T | T | 5 | F |
| ZZZOS Version7.0 | T | T | T | T | T | T | T | T | T | T | T | T | T | T | T | T | T | T | T | T | T | 4 | F |

FIG. 10A

| | | F | G | H | I | J | K | L | M | N | O | P | Q | R | S | T | U | V | W | X | Y | Z |
|---|---|---|---|---|---|---|---|---|---|---|---|---|---|---|---|---|---|---|---|---|---|---|
| | | | PAPER TYPE | | PAPER SIZE | | | | STAPLING | | | | | | | | | PUNCHING (TWO HOLES) | | | | DOUBLE-SIDED PRINTING |
| | | ANY | PP | TP | A5 | A4 | A3 | ANY | L | LOW-ER | R | UP-PER | U L | LOW L | LOW R | U R | ANY | L | LOW-ER | R | UP-PER | |
| UserAgent | XXXOS Version12.3 | F | F | F | T | T | T | T | F | F | F | F | F | F | F | F | T | T | F | F | F | T |

| | 1002 | | | |
|---|---|---|---|---|
| A | B | C | D | E |

| MANAGE-MENT NUMBER | CONSTRAINT RECORD | NUMBER OF CONSTRAINT ITEMS | VALIDITY | RULE DESCRIPTION |
|---|---|---|---|---|
| 1 | 0 | 2 | T | DOUBLE-SIDED PRINTING ON A5 UNAVAILABLE |
| 2 | 0 | 2 | F | DOUBLE-SIDED PRINTING ON THICK PAPER UNAVAILABLE |
| 3 | 0 | 2 | T | PUNCHING AT ANY POSITION ON A5 PAPER UNAVAILABLE |
| 4 | 0 | 2 | T | PUNCHING AT LEFT POSITION ON A5 PAPER UNAVAILABLE |
| 5 | 0 | 2 | F | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | T | STAPLING AT ANY POSITION ON A5 PAPER UNAVAILABLE |
| 9 | 0 | 2 | F | STAPLING AT LEFT POSITION ON A5 PAPER UNAVAILABLE |
| 10 | 0 | 2 | F | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | F | STAPLING AT LOWER LEFT POSITION ON A5 PAPER UNAVAILABLE |
| 15 | 0 | 2 | F | STAPLING AT LOWER RIGHT POSITION ON A5 PAPER UNAVAILABLE |
| 16 | 0 | 2 | F | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | F | STAPLING AT LEFT POSITION ON THICK PAPER UNAVAILABLE |
| 19 | 0 | 2 | F | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | F | STAPLING AT UPPER LEFT POSITION ON THICK PAPER UNAVAILABLE |
| 23 | 0 | 2 | F | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | F | STAPLING AT LEFT POSITION ON A3 PLAIN PAPER UNAVAILABLE |
| 27 | 1 | 3 | F | STAPLING AT RIGHT POSITION ON A3 PLAIN PAPER UNAVAILABLE |
| 28 | 2 | 2 | T | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 10C

| MANAGEMENT NUMBER | PAPER TYPE | | | PAPER SIZE | | | STAPLING | | | | |
|---|---|---|---|---|---|---|---|---|---|---|---|
| | ANY | PLAIN PAPER | THICK PAPER | A5 | A4 | A3 | ANY | LEFT | LOWER | RIGHT | UPPER |
| 1 | | | | T | | | | | | | |
| 2 | | | F | | | | | | | | |
| 3 | | | | T | | | | | | | |
| 4 | | | | T | | | | | | | |
| 5 | | | | T | | | | | | | |
| 6 | | | | T | | | | | | | |
| 7 | | | | T | | | | | | | |
| 8 | | | | T | | | T | | | | |
| 9 | | | | T | | | | F | | | |
| 10 | | | | T | | | | | F | | |
| 11 | | | | T | | | | | | F | |
| 12 | | | | T | | | | | | | F |
| 13 | | | | T | | | | | | | |
| 14 | | | | T | | | | | | | |
| 15 | | | | T | | | | | | | |
| 16 | | | | T | | | | | | | |
| 17 | | | F | | | | T | | | | |
| 18 | | | F | | | | | F | | | |
| 19 | | | F | | | | | | F | | |
| 20 | | | F | | | | | | | F | |
| 21 | | | F | | | | | | | | F |
| 22 | | | F | | | | | | | | |
| 23 | | | F | | | | | | | | |
| 24 | | | F | | | | | | | | |
| 25 | | | F | | | | | | | | |
| 26 | | F | | | | T | | F | | | |
| 27 | | F | | | | T | | | | F | |
| 28 | | | | | | T | | | | | |
| 29 | | | | | | T | | | | | |

FIG. 10D

| MANAGE-MENT NUMBER | STAPLING | | | | PUNCHING (TWO HOLES) | | | | | DOUBLE-SIDED PRINTING |
|---|---|---|---|---|---|---|---|---|---|---|
| | UPPER LEFT | LOWER LEFT | LOWER RIGHT | UPPER RIGHT | ANY | LEFT | LOWER | RIGHT | UPPER | |
| 1 | | | | | | | | | | T |
| 2 | | | | | | | | | | T |
| 3 | | | | | T | | | | | |
| 4 | | | | | | T | | | | |
| 5 | | | | | | | F | | | |
| 6 | | | | | | | | F | | |
| 7 | | | | | | | | | F | |
| 8 | | | | | | | | | | |
| 9 | | | | | | | | | | |
| 10 | | | | | | | | | | |
| 11 | | | | | | | | | | |
| 12 | | | | | | | | | | |
| 13 | T | | | | | | | | | |
| 14 | | F | | | | | | | | |
| 15 | | | F | | | | | | | |
| 16 | | | | F | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | T | | | | | | | | | |
| 23 | | F | | | | | | | | |
| 24 | | | F | | | | | | | |
| 25 | | | | F | | | | | | |
| 26 | | | | | | | | | | |
| 27 | | | | | | | | | | |
| 28 | | | | | | T | | | | |
| 29 | | | | | | | | F | | |

| UserAgent | PAPER TYPE | | | PAPER SIZE | | | | STAPLING | | | | | | | | | PUNCHING (TWO HOLES) | | | | DOUBLE-SIDED PRINTING |
|---|---|---|---|---|---|---|---|---|---|---|---|---|---|---|---|---|---|---|---|---|---|
| | ANY | PP | TP | A5 | A4 | A3 | ANY | L | LOWER | R | UPPER | L | LOW L | LOW R | U R | ANY | L | LOWER | R | UPPER | |
| | F | G | H | I | J | K | L | M | N | O | P | Q | R | S | T | U | V | W | X | Y | Z |
| UNKNOWN | T | F | F | T | T | T | T | F | F | F | F | T | T | T | T | F | F | F | F | T |

FIG. 11B

| MANAGEMENT NUMBER | CONSTRAINT RECORD | NUMBER OF CONSTRAINT ITEMS | VALIDITY | RULE DESCRIPTION |
|---|---|---|---|---|
| 1 | 0 | 2 | T | DOUBLE-SIDED PRINTING ON A5 UNAVAILABLE |
| 2 | 0 | 2 | F | DOUBLE-SIDED PRINTING ON THICK PAPER UNAVAILABLE |
| 3 | 0 | 2 | F | PUNCHING AT ANY POSITION ON A5 PAPER UNAVAILABLE |
| 4 | 0 | 2 | F | PUNCHING AT LEFT POSITION ON A5 PAPER UNAVAILABLE |
| 5 | 0 | 2 | F | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | T | STAPLING AT ANY POSITION ON A5 PAPER UNAVAILABLE |
| 9 | 0 | 2 | F | STAPLING AT LEFT POSITION ON A5 PAPER UNAVAILABLE |
| 10 | 0 | 2 | F | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | T | STAPLING AT LOWER LEFT POSITION ON A5 PAPER UNAVAILABLE |
| 15 | 0 | 2 | T | STAPLING AT LOWER RIGHT POSITION ON A5 PAPER UNAVAILABLE |
| 16 | 0 | 2 | T | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | F | STAPLING AT LEFT POSITION ON THICK PAPER UNAVAILABLE |
| 19 | 0 | 2 | F | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | F | STAPLING AT UPPER LEFT POSITION ON THICK PAPER UNAVAILABLE |
| 23 | 0 | 2 | F | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | F | STAPLING AT LEFT POSITION ON A3 PLAIN PAPER UNAVAILABLE |
| 27 | 1 | 3 | F | STAPLING AT RIGHT POSITION ON A3 PLAIN PAPER UNAVAILABLE |
| 28 | 2 | 2 | F | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 11C

| A | F | G | H | I | J | K | L | M | N | O | P |
|---|---|---|---|---|---|---|---|---|---|---|---|
| MANAGEMENT NUMBER | PAPER TYPE | | | PAPER SIZE | | | STAPLING | | | | |
| | ANY | PLAIN PAPER | THICK PAPER | A5 | A4 | A3 | ANY | LEFT | LOWER | RIGHT | UPPER |
| 1 | | | | T | | | | | | | |
| 2 | | | F | | | | | | | | |
| 3 | | | | T | | | | | | | |
| 4 | | | | T | | | | | | | |
| 5 | | | | T | | | | | | | |
| 6 | | | | T | | | | | | | |
| 7 | | | | T | | | | | | | |
| 8 | | | | T | | | T | | | | |
| 9 | | | | T | | | | F | | | |
| 10 | | | | T | | | | | F | | |
| 11 | | | | T | | | | | | F | |
| 12 | | | | T | | | | | | | F |
| 13 | | | | T | | | | | | | |
| 14 | | | | T | | | | | | | |
| 15 | | | | T | | | | | | | |
| 16 | | | | T | | | | | | | |
| 17 | | | F | | | | T | | | | |
| 18 | | | F | | | | | F | | | |
| 19 | | | F | | | | | | F | | |
| 20 | | | F | | | | | | | F | |
| 21 | | | F | | | | | | | | F |
| 22 | | | F | | | | | | | | |
| 23 | | | F | | | | | | | | |
| 24 | | | F | | | | | | | | |
| 25 | | | F | | | | | | | | |
| 26 | | F | | | | T | | F | | | |
| 27 | | F | | | | T | | | | F | |
| 28 | | | | | | T | | F | | | |
| 29 | | | | | | T | | | | F | |

| Management Number (A) | Stapling | | | | Punching (Two Holes) | | | | | Double-Sided Printing (Z) |
|---|---|---|---|---|---|---|---|---|---|---|
| | Upper Left (Q) | Lower Left (R) | Lower Right (S) | Upper Right (T) | Any (U) | Left (V) | Lower (W) | Right (X) | Upper (Y) | |
| 1 | | | | | | | | | | T |
| 2 | | | | | | | | | | T |
| 3 | | | | | F | | | | | |
| 4 | | | | | | F | | | | |
| 5 | | | | | | | F | | | |
| 6 | | | | | | | | F | | |
| 7 | | | | | | | | | F | |
| 8 | | | | | | | | | | |
| 9 | | | | | | | | | | |
| 10 | | | | | | | | | | |
| 11 | | | | | | | | | | |
| 12 | | | | | | | | | | |
| 13 | T | | | | | | | | | |
| 14 | | T | | | | | | | | |
| 15 | | | T | | | | | | | |
| 16 | | | | T | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | T | | | | | | | | | |
| 23 | | T | | | | | | | | |
| 24 | | | T | | | | | | | |
| 25 | | | | T | | | | | | |
| 26 | | | | | | | | | | |
| 27 | | | | | | | | | | |
| 28 | | | | | | | | | | |
| 29 | | | | | | | | | | |

| UserAgent | MAXIMUM NUMBER OF CONSTRAINT ITEMS |
|---|---|
| YYYOS Version5.0 | 2 |

| A | B | C | D | E |
|---|---|---|---|---|
| MANAGE-MENT NUMBER | CONSTRAINT RECORD | NUMBER OF CONSTRAINT ITEMS | VALIDITY | RULE DESCRIPTION |
| 1 | 0 | 2 | T | DOUBLE-SIDED PRINTING ON A5 UNAVAILABLE |
| 2 | 0 | 2 | F | DOUBLE-SIDED PRINTING ON THICK PAPER UNAVAILABLE |
| 3 | 0 | 2 | F | PUNCHING AT ANY POSITION ON A5 PAPER UNAVAILABLE |
| 4 | 0 | 2 | F | PUNCHING AT LEFT POSITION ON A5 PAPER UNAVAILABLE |
| 5 | 0 | 2 | F | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | T | STAPLING AT ANY POSITION ON A5 PAPER UNAVAILABLE |
| 9 | 0 | 2 | F | STAPLING AT LEFT POSITION ON A5 PAPER UNAVAILABLE |
| 10 | 0 | 2 | F | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | T | STAPLING AT LOWER LEFT POSITION ON A5 PAPER UNAVAILABLE |
| 15 | 0 | 2 | T | STAPLING AT LOWER RIGHT POSITION ON A5 PAPER UNAVAILABLE |
| 16 | 0 | 2 | T | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | F | STAPLING AT LEFT POSITION ON THICK PAPER UNAVAILABLE |
| 19 | 0 | 2 | F | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | F | STAPLING AT UPPER LEFT POSITION ON THICK PAPER UNAVAILABLE |
| 23 | 0 | 2 | F | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | F | STAPLING AT LEFT POSITION ON A3 PLAIN PAPER UNAVAILABLE |
| 27 | 1 | 3 | F | STAPLING AT RIGHT POSITION ON A3 PLAIN PAPER UNAVAILABLE |
| 28 | 2 | 2 | F | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 12B

```
operation-id : Get-Printer-Attributes
    ⋮
"client-attributes" ={
"constraints-items-max" = "2";  ~~~603
}
    ⋮
```

| A | F | G | H | I | J | K | L | M | N | O | P |
|---|---|---|---|---|---|---|---|---|---|---|---|
| MANAGE-MENT NUMBER | PAPER TYPE | | | PAPER SIZE | | | STAPLING | | | | |
| | ANY | PLAIN PAPER | THICK PAPER | A5 | A4 | A3 | ANY | LEFT | LOWER | RIGHT | UPPER |
| 1 | | | | T | | | | | | | |
| 2 | | | T | | | | | | | | |
| 3 | | | | T | | | | | | | |
| 4 | | | | T | | | | | | | |
| 5 | | | | T | | | | | | | |
| 6 | | | | T | | | | | | | |
| 7 | | | | T | | | | | | | |
| 8 | | | | T | | | T | | | | |
| 9 | | | | T | | | | T | | | |
| 10 | | | | T | | | | | T | | |
| 11 | | | | T | | | | | | T | |
| 12 | | | | T | | | | | | | T |
| 13 | | | | T | | | | | | | |
| 14 | | | | T | | | | | | | |
| 15 | | | | T | | | | | | | |
| 16 | | | | T | | | | | | | |
| 17 | | | T | | | | T | | | | |
| 18 | | | T | | | | | T | | | |
| 19 | | | T | | | | | | T | | |
| 20 | | | T | | | | | | | T | |
| 21 | | | T | | | | | | | | T |
| 22 | | | T | | | | | | | | |
| 23 | | | T | | | | | | | | |
| 24 | | | T | | | | | | | | |
| 25 | | | T | | | | | | | | |
| 26 | | F | | | | | F | F | | | |
| 27 | | F | | | | | F | | | F | |
| 28 | | | | | | | T | T | | | |
| 29 | | | | | | | T | | | T | |

FIG. 12C

| A | STAPLING | | | | PUNCHING(TWO HOLES) | | | | | Z |
|---|---|---|---|---|---|---|---|---|---|---|
| MANAGE-MENT NUMBER | UPPER LEFT | LOWER LEFT | LOWER RIGHT | UPPER RIGHT | ANY | LEFT | LOWER | RIGHT | UPPER | DOUBLE-SIDED PRINTING |
| 1 | | | | | | | | | | T |
| 2 | | | | | | | | | | T |
| 3 | | | | | T | | | | | |
| 4 | | | | | | T | | | | |
| 5 | | | | | | | T | | | |
| 6 | | | | | | | | T | | |
| 7 | | | | | | | | | T | |
| 8 | | | | | | | | | | |
| 9 | | | | | | | | | | |
| 10 | | | | | | | | | | |
| 11 | | | | | | | | | | |
| 12 | | | | | | | | | | |
| 13 | T | | | | | | | | | |
| 14 | | T | | | | | | | | |
| 15 | | | T | | | | | | | |
| 16 | | | | T | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | T | | | | | | | | | |
| 23 | | T | | | | | | | | |
| 24 | | | T | | | | | | | |
| 25 | | | | T | | | | | | |
| 26 | | | | | | | | | | |
| 27 | | | | | | | | | | |
| 28 | | | | | | | | | | |
| 29 | | | | | | | | | | |

FIG. 13B

| A | B | C | D | E |
|---|---|---|---|---|
| MANAGE-MENT NUMBER | CONSTRAINT RECORD | NUMBER OF CONSTRAINT ITEMS | VALIDITY | RULE DESCRIPTION |
| 1 | 0 | 2 | T | DOUBLE-SIDED PRINTING ON A5 UNAVAILABLE |
| 2 | 0 | 2 | F | DOUBLE-SIDED PRINTING ON THICK PAPER UNAVAILABLE |
| 3 | 0 | 2 | F | PUNCHING AT ANY POSITION ON A5 PAPER UNAVAILABLE |
| 4 | 0 | 2 | F | PUNCHING AT LEFT POSITION ON A5 PAPER UNAVAILABLE |
| 5 | 0 | 2 | F | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | T | STAPLING AT ANY POSITION ON A5 PAPER UNAVAILABLE |
| 9 | 0 | 2 | F | STAPLING AT LEFT POSITION ON A5 PAPER UNAVAILABLE |
| 10 | 0 | 2 | F | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | T | STAPLING AT LOWER LEFT POSITION ON A5 PAPER UNAVAILABLE |
| 15 | 0 | 2 | T | STAPLING AT LOWER RIGHT POSITION ON A5 PAPER UNAVAILABLE |
| 16 | 0 | 2 | T | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | F | STAPLING AT LEFT POSITION ON THICK PAPER UNAVAILABLE |
| 19 | 0 | 2 | F | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | F | STAPLING AT UPPER LEFT POSITION ON THICK PAPER UNAVAILABLE |
| 23 | 0 | 2 | F | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | F | STAPLING AT LEFT POSITION ON A3 PLAIN PAPER UNAVAILABLE |
| 27 | 1 | 3 | F | STAPLING AT RIGHT POSITION ON A3 PLAIN PAPER UNAVAILABLE |
| 28 | 2 | 2 | F | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 13C

| MANAGEMENT NUMBER | PAPER TYPE | | | PAPER SIZE | | | STAPLING | | | | |
|---|---|---|---|---|---|---|---|---|---|---|---|
| | ANY | PLAIN PAPER | THICK PAPER | A5 | A4 | A3 | ANY | LEFT | LOWER | RIGHT | UPPER |
| 1 | | | | F | | | | | | | |
| 2 | | | T | F | | | | | | | |
| 3 | | | | F | | | | | | | |
| 4 | | | | F | | | | | | | |
| 5 | | | | F | | | | | | | |
| 6 | | | | F | | | | | | | |
| 7 | | | | F | | | | | | | |
| 8 | | | | F | | | T | | | | |
| 9 | | | | F | | | | T | | | |
| 10 | | | | F | | | | | T | | |
| 11 | | | | F | | | | | | T | |
| 12 | | | | F | | | | | | | T |
| 13 | | | | F | | | | | | | |
| 14 | | | | F | | | | | | | |
| 15 | | | | F | | | | | | | |
| 16 | | | | F | | | | | | | |
| 17 | | | T | | | | T | | | | |
| 18 | | | T | | | | | T | | | |
| 19 | | | T | | | | | | T | | |
| 20 | | | T | | | | | | | T | |
| 21 | | | T | | | | | | | | T |
| 22 | | | T | | | | | | | | |
| 23 | | | T | | | | | | | | |
| 24 | | | T | | | | | | | | |
| 25 | | | T | | | | | | | | |
| 26 | | T | | | | T | | T | | | |
| 27 | | T | | | | T | | | | T | |
| 28 | | | | | | T | | T | | | |
| 29 | | | | | | T | | | | T | |

FIG. 13D

| A | Q | R | S | T | U | V | W | X | Y | Z |
|---|---|---|---|---|---|---|---|---|---|---|
| MANAGE-MENT NUMBER | STAPLING | | | | PUNCHING (TWO HOLES) | | | | | DOUBLE-SIDED PRINTING |
| | UPPER LEFT | LOWER LEFT | LOWER RIGHT | UPPER RIGHT | ANY | LEFT | LOWER | RIGHT | UPPER | |
| 1 | | | | | | | | | | T |
| 2 | | | | | | | | | | T |
| 3 | | | | | T | | | | | |
| 4 | | | | | | T | | | | |
| 5 | | | | | | | T | | | |
| 6 | | | | | | | | T | | |
| 7 | | | | | | | | | T | |
| 8 | | | | | | | | | | |
| 9 | | | | | | | | | | |
| 10 | | | | | | | | | | |
| 11 | | | | | | | | | | |
| 12 | | | | | | | | | | |
| 13 | T | | | | | | | | | |
| 14 | | T | | | | | | | | |
| 15 | | | T | | | | | | | |
| 16 | | | | T | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | T | | | | | | | | | |
| 23 | | T | | | | | | | | |
| 24 | | | T | | | | | | | |
| 25 | | | | T | | | | | | |
| 26 | | | | | | | | | | |
| 27 | | | | | | | | | | |
| 28 | | | | | | | | | | |
| 29 | | | | | | | | | | |

FIG. 14A

| | PAPER TYPE | | | PAPER SIZE | | | STAPLING | | | | | | | | PUNCHING (TWO HOLES) | | | | DOUBLE-SIDED PRINTING |
|---|---|---|---|---|---|---|---|---|---|---|---|---|---|---|---|---|---|---|---|
| | ANY | PP | TP | A5 | A4 | A3 | ANY | L | LOWER | UPPER | R | UL | LOW L | LOW R | UR | ANY | L | LOWER | R | UPPER | |
| | F | G | H | I | J | K | L | M | N | O | P | Q | R | S | T | U | V | W | X | Y | Z |
| USE RECORD OF EACH FUNCTION | 99 | 23 | 3 | 3 | 121 | 10 | 0 | 5 | 5 | 0 | 0 | 35 | 10 | 0 | 0 | 0 | 15 | 5 | 0 | 0 | 45 |

| A | B | C | D | E |
|---|---|---|---|---|
| MANAGEMENT NUMBER | CONSTRAINT RECORD | NUMBER OF CONSTRAINT ITEMS | VALIDITY | RULE DESCRIPTION |
| 1 | 0 | 2 | T | DOUBLE-SIDED PRINTING ON A5 UNAVAILABLE |
| 2 | 0 | 2 | T | DOUBLE-SIDED PRINTING ON THICK PAPER UNAVAILABLE |
| 3 | 0 | 2 | F | PUNCHING AT ANY POSITION ON A5 PAPER UNAVAILABLE |
| 4 | 0 | 2 | T | PUNCHING AT LEFT POSITION ON A5 PAPER UNAVAILABLE |
| 5 | 0 | 2 | T | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | F | STAPLING AT ANY POSITION ON A5 PAPER UNAVAILABLE |
| 9 | 0 | 2 | T | STAPLING AT LEFT POSITION ON A5 PAPER UNAVAILABLE |
| 10 | 0 | 2 | T | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | T | STAPLING AT UPPER LEFT POSITION ON A5 PAPER UNAVAILABLE |
| 14 | 0 | 2 | T | STAPLING AT LOWER LEFT POSITION ON A5 PAPER UNAVAILABLE |
| 15 | 0 | 2 | F | STAPLING AT LOWER RIGHT POSITION ON A5 PAPER UNAVAILABLE |
| 16 | 0 | 2 | F | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | T | STAPLING AT LEFT POSITION ON THICK PAPER UNAVAILABLE |
| 19 | 0 | 2 | T | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | T | STAPLING AT UPPER LEFT POSITION ON THICK PAPER UNAVAILABLE |
| 23 | 0 | 2 | T | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | T | STAPLING AT LEFT POSITION ON A3 PLAIN PAPER UNAVAILABLE |
| 27 | 1 | 3 | F | STAPLING AT RIGHT POSITION ON A3 PLAIN PAPER UNAVAILABLE |
| 28 | 2 | 2 | T | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 14C

| A | F | G | H | I | J | K | L | M | N | O | P |
|---|---|---|---|---|---|---|---|---|---|---|---|
| MANAGEMENT NUMBER | PAPER TYPE ||| PAPER SIZE ||| STAPLING ||||
|  | ANY | PLAIN PAPER | THICK PAPER | A5 | A4 | A3 | ANY | LEFT | LOWER | RIGHT | UPPER |
| 1 |  |  |  | T |  |  |  |  |  |  |  |
| 2 |  |  | T |  |  |  |  |  |  |  |  |
| 3 |  |  |  | T |  |  |  |  |  |  |  |
| 4 |  |  |  | T |  |  |  |  |  |  |  |
| 5 |  |  |  | T |  |  |  |  |  |  |  |
| 6 |  |  |  | T |  |  |  |  |  |  |  |
| 7 |  |  |  | T |  |  |  |  |  |  |  |
| 8 |  |  |  | T |  |  | T |  |  |  |  |
| 9 |  |  |  | T |  |  |  | T |  |  |  |
| 10 |  |  |  | T |  |  |  |  | T |  |  |
| 11 |  |  |  | T |  |  |  |  |  | F |  |
| 12 |  |  |  | T |  |  |  |  |  |  | F |
| 13 |  |  |  | T |  |  |  |  |  |  |  |
| 14 |  |  |  | T |  |  |  |  |  |  |  |
| 15 |  |  |  | T |  |  |  |  |  |  |  |
| 16 |  |  |  | T |  |  |  |  |  |  |  |
| 17 |  |  | T |  |  |  | T |  |  |  |  |
| 18 |  |  | T |  |  |  |  | T |  |  |  |
| 19 |  |  | T |  |  |  |  |  | T |  |  |
| 20 |  |  | T |  |  |  |  |  |  | F |  |
| 21 |  |  | T |  |  |  |  |  |  |  | F |
| 22 |  |  | T |  |  |  |  |  |  |  |  |
| 23 |  |  | T |  |  |  |  |  |  |  |  |
| 24 |  |  | T |  |  |  |  |  |  |  |  |
| 25 |  |  | T |  |  |  |  |  |  |  |  |
| 26 |  | T |  |  |  | T | T |  |  |  |  |
| 27 |  | T |  |  |  | T |  |  |  | F |  |
| 28 |  |  |  |  |  | T |  | T |  |  |  |
| 29 |  |  |  |  |  | T |  |  |  | F |  |

FIG. 14D

| MANAGEMENT NUMBER | STAPLING | | | | PUNCHING (TWO HOLES) | | | | | DOUBLE-SIDED PRINTING |
|---|---|---|---|---|---|---|---|---|---|---|
| | UPPER LEFT | LOWER LEFT | LOWER RIGHT | UPPER RIGHT | ANY | LEFT | LOWER | RIGHT | UPPER | |
| 1 | | | | | | | | | | T |
| 2 | | | | | | | | | | T |
| 3 | | | | | F | | | | | |
| 4 | | | | | | T | | | | |
| 5 | | | | | | | T | | | |
| 6 | | | | | | | | F | | |
| 7 | | | | | | | | | F | |
| 8 | | | | | | | | | | |
| 9 | | | | | | | | | | |
| 10 | | | | | | | | | | |
| 11 | | | | | | | | | | |
| 12 | | | | | | | | | | |
| 13 | T | | | | | | | | | |
| 14 | | T | | | | | | | | |
| 15 | | | F | | | | | | | |
| 16 | | | | F | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | T | | | | | | | | | |
| 23 | | T | | | | | | | | |
| 24 | | | F | | | | | | | |
| 25 | | | | F | | | | | | |
| 26 | | | | | | | | | | |
| 27 | | | | | | | | | | |
| 28 | | | | | | | | | | |
| 29 | | | | | | | | | | |

| A | B | C | D | E |
|---|---|---|---|---|
| MANAGE-MENT NUMBER | CONSTRAINT RECORD | NUMBER OF CONSTRAINT ITEMS | VALIDITY | RULE DESCRIPTION |
| 1 | 0 | 2 | F | DOUBLE-SIDED PRINTING ON A5 UNAVAILABLE |
| 2 | 0 | 2 | F | DOUBLE-SIDED PRINTING ON THICK PAPER UNAVAILABLE |
| 3 | 0 | 2 | F | PUNCHING AT ANY POSITION ON A5 PAPER UNAVAILABLE |
| 4 | 0 | 2 | F | PUNCHING AT LEFT POSITION ON A5 PAPER UNAVAILABLE |
| 5 | 0 | 2 | F | PUNCHING AT LOWER POSITION ON A5 PAPER UNAVAILABLE |
| 6 | 0 | 2 | F | PUNCHING AT RIGHT POSITION ON A5 PAPER UNAVAILABLE |
| 7 | 0 | 2 | F | PUNCHING AT UPPER POSITION ON A5 PAPER UNAVAILABLE |
| 8 | 0 | 2 | F | STAPLING AT ANY POSITION ON A5 PAPER UNAVAILABLE |
| 9 | 0 | 2 | F | STAPLING AT LEFT POSITION ON A5 PAPER UNAVAILABLE |
| 10 | 0 | 2 | F | STAPLING AT LOWER POSITION ON A5 PAPER UNAVAILABLE |
| 11 | 0 | 2 | F | STAPLING AT RIGHT POSITION ON A5 PAPER UNAVAILABLE |
| 12 | 0 | 2 | F | STAPLING AT UPPER POSITION ON A5 PAPER UNAVAILABLE |
| 13 | 0 | 2 | F | STAPLING AT UPPER LEFT POSITION ON A5 PAPER UNAVAILABLE |
| 14 | 0 | 2 | F | STAPLING AT LOWER LEFT POSITION ON A5 PAPER UNAVAILABLE |
| 15 | 0 | 2 | F | STAPLING AT LOWER RIGHT POSITION ON A5 PAPER UNAVAILABLE |
| 16 | 0 | 2 | F | STAPLING AT UPPER RIGHT POSITION ON A5 PAPER UNAVAILABLE |
| 17 | 0 | 2 | F | STAPLING AT ANY POSITION ON THICK PAPER UNAVAILABLE |
| 18 | 0 | 2 | F | STAPLING AT LEFT POSITION ON THICK PAPER UNAVAILABLE |
| 19 | 0 | 2 | F | STAPLING AT LOWER POSITION ON THICK PAPER UNAVAILABLE |
| 20 | 0 | 2 | F | STAPLING AT RIGHT POSITION ON THICK PAPER UNAVAILABLE |
| 21 | 0 | 2 | F | STAPLING AT UPPER POSITION ON THICK PAPER UNAVAILABLE |
| 22 | 0 | 2 | F | STAPLING AT UPPER LEFT POSITION ON THICK PAPER UNAVAILABLE |
| 23 | 0 | 2 | F | STAPLING AT LOWER LEFT POSITION ON THICK PAPER UNAVAILABLE |
| 24 | 0 | 2 | F | STAPLING AT LOWER RIGHT POSITION ON THICK PAPER UNAVAILABLE |
| 25 | 0 | 2 | F | STAPLING AT UPPER RIGHT POSITION ON THICK PAPER UNAVAILABLE |
| 26 | 10 | 3 | T | STAPLING AT LEFT POSITION ON A3 PLAIN PAPER UNAVAILABLE |
| 27 | 1 | 3 | T | STAPLING AT RIGHT POSITION ON A3 PLAIN PAPER UNAVAILABLE |
| 28 | 2 | 2 | T | PUNCHING AT LEFT POSITION ON A3 PAPER UNAVAILABLE |
| 29 | 0 | 2 | F | PUNCHING AT RIGHT POSITION ON A3 PAPER UNAVAILABLE |

FIG. 15B

| A | F | G | H | I | J | K | L | M | N | O | P |
|---|---|---|---|---|---|---|---|---|---|---|---|
| MANAGE-MENT NUMBER | PAPER TYPE | | | PAPER SIZE | | | STAPLING | | | | |
| | ANY | PLAIN PAPER | THICK PAPER | A5 | A4 | A3 | ANY | LEFT | LOWER | RIGHT | UPPER |
| 1 | | | | F | | | | | | | |
| 2 | | | F | | | | | | | | |
| 3 | | | | F | | | | | | | |
| 4 | | | | F | | | | | | | |
| 5 | | | | F | | | | | | | |
| 6 | | | | F | | | | | | | |
| 7 | | | | F | | | | | | | |
| 8 | | | | F | | | F | | | | |
| 9 | | | | F | | | | F | | | |
| 10 | | | | F | | | | | F | | |
| 11 | | | | F | | | | | | F | |
| 12 | | | | F | | | | | | | F |
| 13 | | | | F | | | | | | | |
| 14 | | | | F | | | | | | | |
| 15 | | | | F | | | | | | | |
| 16 | | | | F | | | | | | | |
| 17 | | | F | | | | F | | | | |
| 18 | | | F | | | | | F | | | |
| 19 | | | F | | | | | | F | | |
| 20 | | | F | | | | | | | F | |
| 21 | | | F | | | | | | | | F |
| 22 | | | F | | | | | | | | |
| 23 | | | F | | | | | | | | |
| 24 | | | F | | | | | | | | |
| 25 | | | F | | | | | | | | |
| 26 | | T | | | | T | | T | | | |
| 27 | | T | | | | T | | | | T | |
| 28 | | | | | | T | | T | | | |
| 29 | | | | | | F | | | | F | |

FIG. 15C

| A | Q | R | S | T | U | V | W | X | Y | Z |
|---|---|---|---|---|---|---|---|---|---|---|
| MANAGE-MENT NUMBER | STAPLING | | | | PUNCHING (TWO HOLES) | | | | | DOUBLE-SIDED PRINTING |
| | UPPER LEFT | LOWER LEFT | LOWER RIGHT | UPPER RIGHT | ANY | LEFT | LOWER | RIGHT | UPPER | |
| 1 | | | | | | | | | | F |
| 2 | | | | | | | | | | F |
| 3 | | | | | F | | | | | |
| 4 | | | | | | F | | | | |
| 5 | | | | | | | F | | | |
| 6 | | | | | | | | F | | |
| 7 | | | | | | | | | F | |
| 8 | | | | | | | | | | |
| 9 | | | | | | | | | | |
| 10 | | | | | | | | | | |
| 11 | | | | | | | | | | |
| 12 | | | | | | | | | | |
| 13 | F | | | | | | | | | |
| 14 | | F | | | | | | | | |
| 15 | | | F | | | | | | | |
| 16 | | | | F | | | | | | |
| 17 | | | | | | | | | | |
| 18 | | | | | | | | | | |
| 19 | | | | | | | | | | |
| 20 | | | | | | | | | | |
| 21 | | | | | | | | | | |
| 22 | F | | | | | | | | | |
| 23 | | F | | | | | | | | |
| 24 | | | F | | | | | | | |
| 25 | | | | F | | | | | | |
| 26 | | | | | | | | | | |
| 27 | | | | | | | | | | |
| 28 | | | | | | | | | | |
| 29 | | | | | | | | | | |

PRINT SYSTEM, PRINTING APPARATUS AND METHOD OF CONTROLLING THE SAME, AND STORAGE MEDIUM

BACKGROUND OF THE INVENTION

Field of the Invention

The present invention relates to a print system, a printing apparatus and a method of controlling the same, and a storage medium.

Description of the Related Art

There are printing apparatuses that receive print data from an information processing apparatus, such as a PC, and perform printing. It is also known that information processing apparatuses generate print data using a printer driver (or a print application) that is designed for each printing apparatus. However, recent information processing apparatuses more often generate print data without going through a printer driver (or a print application) that is designed for each printing apparatus. For example, in recent print applications or cloud print services, print data that conforms to the IPP (Internet Printing Protocol) standard is generated and is sent to a printing apparatus. For this, see RFC2911 https://tools.ietf.org/html/rfc2911, or PWG 5100.13 Job and Printer Extensions (https://ftp.pwg.org/pub/pwg/candidates/cs-ippjobprinterext3v10-20120727-5100.13.pdf). Thus, a printing apparatus is in an environment in which the printing apparatus receives print jobs from various devices. It is desirable that each print job includes print settings and print data that can be processed by the printing apparatus, but there may be cases where this does not apply.

A printer driver for an ordinary printing apparatus provides a plurality of setting items, such as paper type selection, image quality settings, and finishing selection, but there may be cases where these setting items cannot be dealt with at the same time depending on settings. These are usually called constraint information, and if such settings are made, a message or the like indicating that the set combination of items cannot be designated is fed back to a user.

Conventionally, a printer driver provided by a vendor of a printing apparatus has constraint information that is optimized for each printing apparatus and is held in advance in a program, and restricts unavailable combinations of items in a setting screen for setting printing items.

Meanwhile, in IPP printing, which is employed for printing from a mobile device, a mobile device does not have a printer driver for each printing apparatus, and dynamically generates a print screen and constraint information based on capability information provided by a target printing apparatus. In this case, although it also depends on implementation by a client, constraint information needs to be resent from the printing apparatus to the mobile device when necessary. For this reason, if the constraint information is transmitted, as-is, from the printing apparatus to the mobile device, the data size thereof is large. In particular, if the mobile device communicates with the printing apparatus via a wireless LAN, problems may arise, e.g. display of a setting screen for printing takes time to be delayed by the mobile device. With this in the background, it is desirable in IPP printing that the data size of the constraint information to be transferred from the printing apparatus to the mobile device or the like is small.

SUMMARY OF THE INVENTION

An aspect of the present invention is to eliminate the above-mentioned problem with conventional technology.

The feature of the present invention is to provide a technique of a mechanism for exchanging information regarding settings related to efficient printing.

According to a first aspect of the present invention, there is provided a printing apparatus for performing printing in accordance with a print job transmitted from an information processing apparatus, the printing apparatus comprising: a controller, having at least one processor which executes instructions stored in a memory, one or more circuitry, or, a combination of the at least one processor and the one or more circuitry, being configured to: receive information related to a setting that is able to be configured in the information processing apparatus; store constraint information regarding the printing apparatus; and notify the information processing apparatus of a constraint condition obtained by narrowing down the stored constraint information, based on the information related to the setting, and on attribute information related to the information processing apparatus or the printing apparatus.

According to a second aspect of the present invention, there is provided a printing apparatus for performing printing in accordance with a print job transmitted from an information processing apparatus, the printing apparatus comprising: a controller, having at least one processor which executes instructions stored in a memory, one or more circuitry, or, a combination of the at least one processor and the one or more circuitry, being configured to: receive identification information regarding the information processing apparatus; store information related to a setting that is able to be configured in the information processing apparatus, in association with the identification information regarding the information processing apparatus; store constraint information regarding the printing apparatus; and notify, upon receiving a request for attribute information regarding the printing apparatus from the information processing apparatus, the information processing apparatus of a constraint condition obtained by narrowing down the stored constraint information, based on the information related to the setting corresponding to the identification information and on the attribute information.

According to a third aspect of the present invention, there is provided a method of controlling a printing apparatus for performing printing in accordance with a print job transmitted from an information processing apparatus, the method comprising: receiving information related to a setting that is able to be configured in the information processing apparatus; storing constraint information regarding the printing apparatus; and notifying the information processing apparatus of a constraint condition obtained by narrowing down the constraint information stored as a result of the storing, based on the information related to the setting, and on attribute information related to the information processing apparatus or the printing apparatus.

According to a fourth aspect of the present invention, there is provided a method of controlling a printing apparatus for performing printing in accordance with a print job transmitted from an information processing apparatus, the method comprising: receiving identification information regarding the information processing apparatus; storing information related to a setting that is able to be configured in the information processing apparatus, in association with the identification information regarding the information processing apparatus; storing constraint information regarding the printing apparatus; and upon receiving a request for attribute information regarding the printing apparatus from the information processing apparatus, notifying the information processing apparatus of a constraint condition obtained by narrowing down the constraint information stored as a result of the storing, based on the information related to the setting corresponding to the identification information and on the attribute information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 depicts a view illustrating examples of messages in IPP communication that are exchanged between an information processing apparatus and the printing apparatus according to an embodiment.

FIG. 7 is a flowchart for describing processing by which the printing apparatus according to an embodiment registers or deletes constraint information to or from a constraint condition list based on constraint information registered in a constraint condition DB and setting information regarding an information processing apparatus.

FIGS. 8A-8D depict views illustrating examples of a data configuration of the constraint condition DB in the printing apparatus according to an embodiment.

FIG. 9 depicts a view illustrating an example of constraint conditions for respective users (users of information processing apparatuses) stored in a client capability DB.

FIGS. 10A-10D depict views illustrating examples in which the content of the constraint condition DB in FIGS. 8A-8C has been narrowed down based on constraint conditions for a user (XXXOS Version12.3).

FIGS. 11A-11D depict views illustrating examples of narrowing down the constraint information in the constraint condition DB in FIGS. 8A-8C based on received information that can be configured in an information processing apparatus.

FIGS. 12A-12C depict views illustrating examples of narrowing down constraint information when UserAgent of the information processing apparatus is "YYYOSVersion5.0".

FIGS. 13A-13D depict views illustrating examples of narrowing down constraint conditions associated with paper information that is not set on the printing apparatus, based on paper types and paper sizes that are set for paper feed stages of the printing apparatus.

FIGS. 14A-14D depict views illustrating examples of narrowing down constraint conditions based on usage records of print functions of the printing apparatus.

FIGS. 15A-15C depict views illustrating examples of narrowing down constraint conditions based on a record of the constraint conditions.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
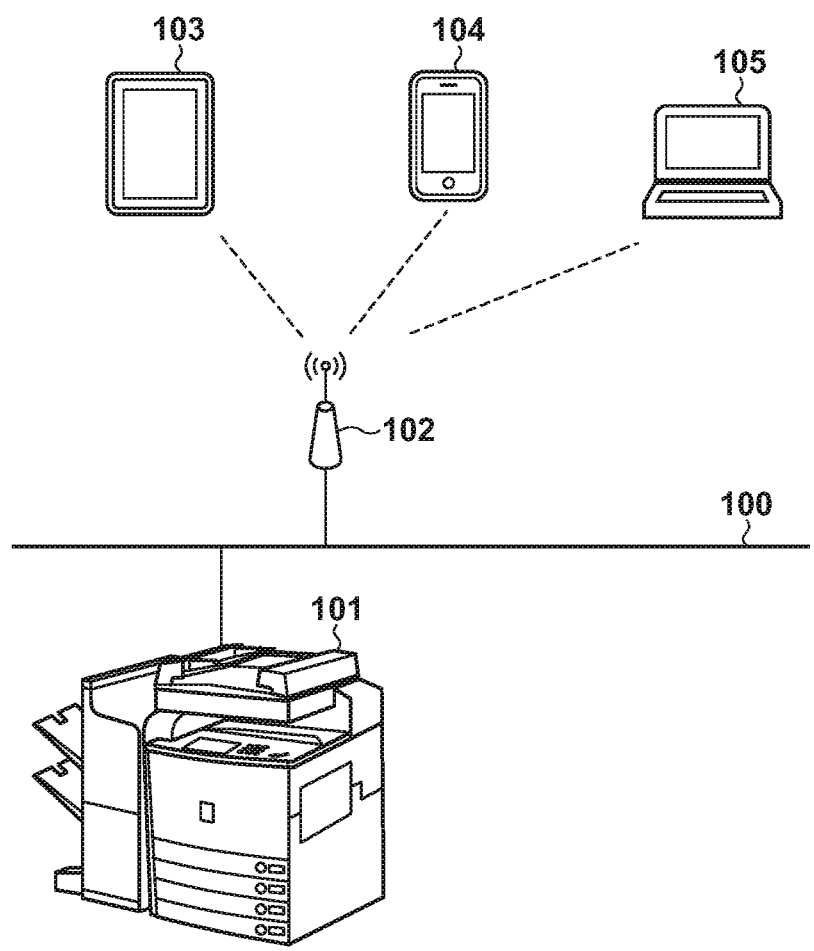
FIG. 1 illustrates a configuration of a print system according to an embodiment of the present invention.

FIG. 1 illustrates a configuration of a print system according to the embodiment of the present invention.

A printing apparatus 101 and an AP (access point) 102 are communicably connected to each other on a LAN (Local Area Network) 100. In the embodiment, a description will be given while taking mobile terminals, such as a tablet 103, a smartphone 104, and a PC, as examples of information processing apparatuses. Note that, in the following description, the tablet 103, the smartphone, 104, and the like will be collectively called information processing apparatuses. These information processing apparatuses can communicate with the printing apparatus 101 on the LAN 100 via the AP 102. A management server 105 for managing print settings manages information related to a print function that can be set by respective users of the information processing apparatuses 103 and 104 when the printing apparatus 101 processes a print job. Upon receiving a print job from any of these information processing apparatuses, the printing apparatus 101 performs print processing.

Although the embodiment will give a description while taking the above-described configuration as an example of the print system, the present invention is not limited thereto, and at least one or more information processing apparatuses need only be communicably connected to the printing apparatus via a network. The network may be either wireless or wired.

The printing apparatus 101 will be described first. This printing apparatus 101 is a multifunction peripheral (MFP), for example, and has a print function of printing images on sheets (recording media), a scan function of reading originals, a facsimile communication function, a box function, and so on. The printing apparatus 101 can perform print processing based on print data received via the network.

Figure 2:
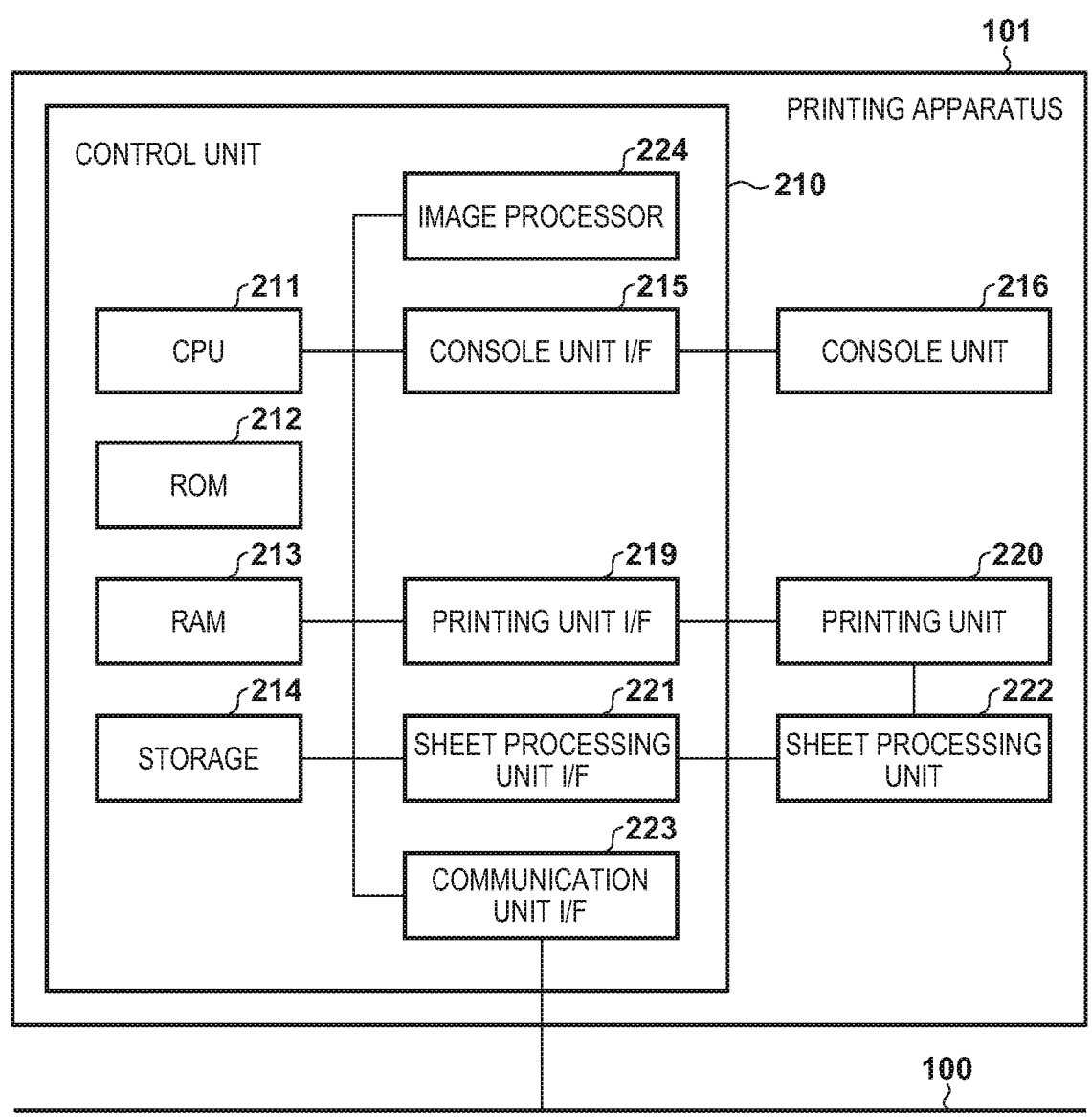
FIG. 2 is a block diagram for describing a hardware configuration of a printing apparatus according to an embodiment.

FIG. 2 is a block diagram for describing a hardware configuration of the printing apparatus 101 according to the embodiment.

A control unit 210, which includes a CPU (Central Processing Unit) 211, controls operations of the entire printing apparatus 101. The CPU 211 deploys a program stored in a ROM (Read Only Memory) 212 or a storage 214 to a RAM 213, and executes the deployed program to perform various kinds of control, such as print control and read control. The ROM 212 stores a control program, a boot program, and the like that can be executed by the CPU 211. The RAM (Random Access Memory) 213 is a main storage memory for the CPU 211, and is used as a work area or a temporal storage area for deploying various control programs. The storage 214 stores print data, image data, various programs, and various kinds of setting information. In the embodiment, an auxiliary storage device such as a HDD (Hard Disk Drive) is envisioned as the storage 214, but a nonvolatile memory such as an SSD (Solid State Drive) may alternatively be used.

Note that it is assumed, in the printing apparatus 101 according to the embodiment, that one CPU 211 performs processing illustrated in a later-described flowchart using one memory (RAM 213), but any other mode may alternatively be employed. For example, processing illustrated in a later-described flowchart may be performed by causing a plurality of CPUs, RAMs, ROMs, and storages to work together. Also, processing may partially be performed using a hardware circuit such as an ASIC (Application Specific Integrated Circuit) or an FPGA (Field-Programmable Gate Array).

A console unit interface (I/F) 215 connects a console unit 216 to the control unit 210. The console unit 216 is equipped with a display unit that has a touch panel function, various hard keys, and so on, and functions as a display unit for displaying information and an accepting unit for accepting instructions from a user. A printing unit I/F 219 connects a printing unit (printer engine) 220 to the control unit 210. Image data that is generated by analyzing a print job received from an information processing apparatus is transferred from the control unit 210 to the printing unit 220 via the printing unit I/F 219. The printing unit 220 receives a control command and a print job for which printing is to be performed, via the control unit 210, and prints an image on a sheet fed from a paper feed cassette (not shown) for accommodating sheets, based on the print job. Note that the printing method of the printing unit 220 may be an electrophotographic method, or may be an inkjet method. Also, any other printing methods, such as a thermal transfer method, may be applied. The control unit 210 is also connected to the LAN 100 via a communication unit I/F 223. The communication unit I/F 223 transmits image data and information to the information processing apparatuses on the LAN 100, and receives print jobs and information from the information processing apparatuses on the LAN 100.

An image processor 224 has an RIP (Raster Image Processor) function of rendering a print job received via the LAN 100 to generate image data to be used in printing. The image processor 224 can also perform resolution conversion and correction processing on image data obtained by rendering a print job. In the embodiment, it is envisioned that the image processor 224 is realized by a hardware circuit (e.g. an ASIC or an FPGA etc.), but this may not be the case. For example, the printing apparatus 101 may also include a processor for image processing, and realize image processing and print data rendering processing by this processor performing an image processing program. In this case, this processor and the CPU 211 work together to realize the later-described flowchart. Furthermore, a configuration can also be employed in which the CPU 211 executes a program for performing image processing to perform image processing and print data rendering processing. Also, image processing may be performed by combining any of these options. A sheet processing unit I/F 221 connects the control unit 210 to a sheet processing unit 222. The sheet processing unit 222 receives a control command from the control unit 210, and performs post-processing on a sheet that has been printed by the printing unit 220, in accordance with the received control command.

Figure 3:
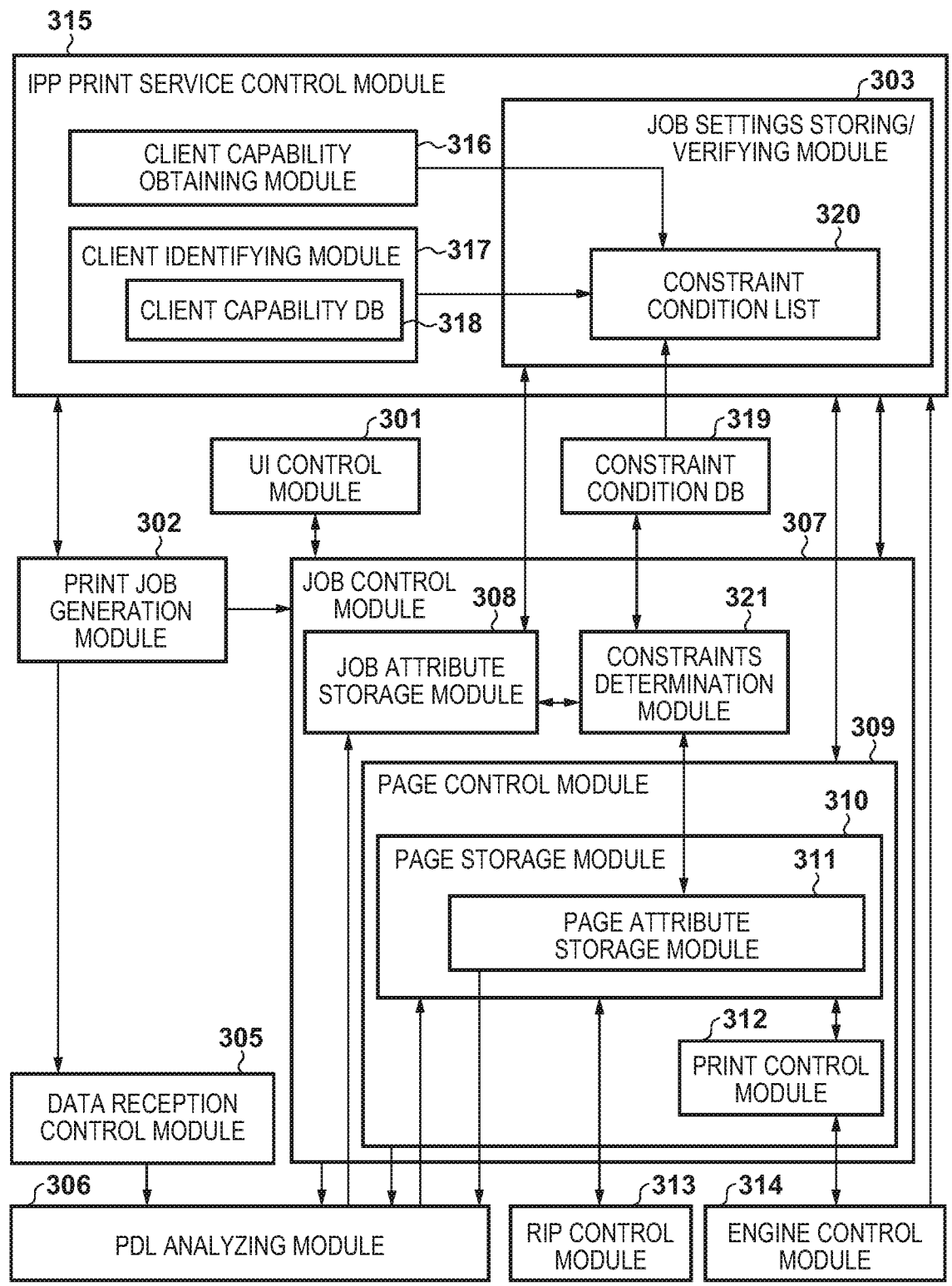
FIG. 3 is a functional block diagram for describing a software configuration of the printing apparatus according to an embodiment.

FIG. 3 is a functional block diagram for describing a software configuration of the printing apparatus 101 according to the embodiment. In the embodiment, each of the functional blocks shown in FIG. 3 is realized by the CPU 211 executing a program deployed to the RAM 213.

An IPP print service control module 315 notifies an information processing apparatus of capability information regarding the printing unit 220 that is obtained from an engine control module 314, and constraint information regarding print settings. The capability information includes detailed specifications to be displayed on an ordinary print setting screen, such as available paper sizes and paper types, single-sided/double-sided, and finishing settings such as stapling and punching. Attribute information in this embodiment may include the capability information. The constraint information is generated based on the capability information regarding the printing apparatus 101, as well as a print setting function supported by the information processing apparatus and constraint information.

Thus, the information processing apparatus generates a print setting screen based on the capability information received from the printing apparatus 101. Then, the user configures print settings via the print setting screen created based on the capability information, and presses a print button. At this time, the information processing apparatus controls the print setting screen based on the capability information and the constraint information of which the information processing apparatus has been notified by the printing apparatus 101. For example, in the case of a printing apparatus 101 that does not have a finisher, buttons or the like for unavailable post-processing functions such as stapling and punching are grayed out and displayed such that setting items that cannot be combined are unselectable. Upon the print button on the print setting screen being pressed, if the constraint information sent from the printing apparatus 101 is satisfied, a request to verify print job settings is transmitted to the printing apparatus 101. Upon the print button being pressed, the information processing apparatus generates attribute information indicating job attributes, and makes a request to verify the settings made by the user (ValidateJob request) to the printing apparatus 101.

Upon receiving this verification request, the IPP print service control module 315 delivers temporary print setting information to a job settings storing/verifying module 303. The job settings storing/verifying module 303 compares the job attributes set by the information processing apparatus with the print functions of the printing apparatus 101 and the constraint information thereof, and if printing can be performed, the job settings storing/verifying module 303 notifies the information processing apparatus that printing can be performed, via the IPP print service control module 315. On the other hand, if the print setting information includes print settings that cannot be combined in the printing apparatus 101, the job settings storing/verifying module 303 notifies the information processing apparatus that the print job cannot be processed, and makes a request to review the print setting items.

The information processing apparatus transmits the print settings and the print data to the printing apparatus 101 only if none of the constraint conditions held in this information processing apparatus apply and the result of verifying the print settings given from the printing apparatus 101 indicates that printing can be performed.

If any of the constraint conditions apply in the information processing apparatus, or if the information processing apparatus is notified by the printing apparatus 101 that a constraint condition applies, the information processing apparatus prompts the user to change the print settings that fall under the constraint condition. If the user thus changes the print settings and presses the print button again, the information processing apparatus again verifies the print settings, and then makes a request to verify the print settings to the printing apparatus 101.

Upon receiving a print job from the information processing apparatus, the IPP print service control module 315 delivers the print job to a print job generation module 302. Also, the IPP print service control module 315 delivers setting information regarding the print job to the job settings storing/verifying module 303.

Here, a description will be given of the job settings storing/verifying module 303, a constraint condition list 320, a client capability obtaining module 316, a client identifying module 317, and a client capability database (DB) 318, which are included in the IPP print service control module 315. Furthermore, a description will also be given of a constraints determination module 321, which is included in a job control module 307, and a constraint condition DB 319, which is referenced by each module.

The constraint condition DB 319 includes a table that is provided in the printing apparatus 101 and stores all constraint information, and covers all connectable accessories and all settable paper information. An example of the constraint condition DB 319 in the printing apparatus 101 according to the embodiment is shown in FIGS. 8A-8C.

FIGS. 8A-8C depict views illustrating examples of a data configuration of the constraint condition DB 319 in the printing apparatus 101 according to the embodiment.

In FIGS. 8A to 8C, one row indicates one constraint condition. That is, the printing apparatus 101 has 29 constraint conditions, each of which is uniquely identified with a management number in a column A. "Constraint record" in the column B indicates the recorded number of times that respective constraint conditions have been applied when print settings were verified or during verification performed during printing. The recorded number is an example of the attribute information regarding the printing apparatus. If a value of 1 or greater is stored here, such a value indicates that a request to verify print settings related to this constraint condition has been received from the information processing apparatus, or a print job related to this constraint condition has actually been input. The column E indicates the content of an error in the case where a print job is canceled in accordance with the respective constraint condition, and indicates a message that is given as constraint information under the IPP. Columns F to Z indicate print functions of the printing apparatus 101 according to functionalities, and express combinations of constraint items. Note that "ANY" indicates that any paper type may apply, i.e. the paper type is not specified. The columns F to H are for paper types, the columns I to K are for paper sizes, the columns L to T are for stapling, the columns U to Y are for punching, and the column Z is for a double-sided printing setting.

For example, a description will now be given of an example of the constraint condition with the management number 1. The paper size A5 and the double-sided printing setting function are set as T (True) as a constraint condition, and the other functions are set as F (False). Accordingly, the combination of A5 and double-sided printing is the constraint condition, and it is indicated that the printing apparatus 101 cannot process a print job under this condition. Also, since the value of the constraint record is "0", it can be understood that there is no record of a request to verify the settings of a print job that falls under this constraint condition, or cancellation of a job during print processing.

Meanwhile, as for the management number 26, the value of the constraint record in the column B is 1 or greater, that is, this constraint condition has been applied 10 times. The constraint records are updated in accordance with the results of the job settings storing/verifying module 303 or the constraints determination module 321 verifying the respective constraint conditions while a print job is being processed. The number of constraint items in the column C indicates the number of items in a multi-variant expression that expresses each constraint condition. If the value of the number of constraint items exceeds the capability of the information processing apparatus, these constraint items cannot be dealt with. A counter is given below a function title in each of the columns F to Z. This counter indicates the number of times that the corresponding function has been used in the printing apparatus 101 during printing, and the value of the counter is incremented by a print control module 312 every time output is made.

The job settings storing/verifying module 303 verifies print settings of a print job before and after the print job is input, in accordance with a request from the information processing apparatus. Setting verification processing immediately before a job is input is performed by the constraint condition DB 319. If any of the constraint conditions apply here, the information processing apparatus is notified that printing cannot be performed according to the verification result, and is also notified, necessarily, of the relevant constraint condition as constraint information. Then, the counter of the relevant constraint condition (the value in the column B) is incremented. Thus, regarding inquiries about constraint information that are made next time and subsequently, this constraint condition due to which printing cannot be performed is added to the constraint condition list 320.

FIG. 8D indicates a usage record of each function of the printing apparatus 101 according to the embodiment. In the items of "stapling" and "punching" in FIG. 8D, "L" indicates "Left", "R" indicates "Right", "UL" indicates "Upper Left", "UR" indicates "Upper Right", "LOW L" indicates "Lower Left" and ""LOW R" indicates "Lower Right". The abbreviations are applied in the following figures.

The constraint condition list 320 manages pieces of subset information regarding the constraint information held in the constraint condition DB 319. This subset information dynamically changes depending on various later-described conditions, such as capability information and identification information regarding the printing apparatus 101 and set values for the paper feed stages. The configuration, set values, and the like of the paper feed stages are also included in the capability information regarding the printing apparatus. That is to say, such information may be used as attribute information serving as the capability information regarding the printing apparatus, to generate constraint conditions. The constraint condition list 320 is used to generate constraint information of which the printing apparatus 101 notifies the information processing apparatus. The subset information is prepared to reduce the data volume of the constraint information to be transmitted from the printing apparatus 101 to the information processing apparatus. For example, in the example in FIGS. 8A-8C, if the information processing apparatus cannot designate "heavy paper" as the paper type and "A5" as the paper size, only the constraint information with the management numbers 26 to 29 is included in the constraint condition list 320.

FIG. 9 depicts a view illustrating an example of constraint conditions for each user (user account of an information processing apparatus) stored in the client capability DB 318. In FIG. 9, a paper type "PP" and "TP" indicate "Plain Paper" and "Thick Paper", respectively. The abbreviations are applied in the following figures.

FIGS. 10A-10D depict views illustrating examples in which the content of the constraint condition DB in FIGS. 8A-8C has been narrowed down based on a constraint condition 1001 for a user (XXXOS Version12.3).

In a constraint condition list 1002 in FIGS. 10A-10D, combinations of items that are set as "T" in the constraint condition 1001 and items that are set as "T" in FIGS. 8A-8C are set as constraint conditions "T". That is to say, combinations with which the logical product of the constraint condition 1001 and the constraint condition DB 319 in FIGS. 8A-8C is "T" are set as constraint conditions "T". Accordingly, in this case, only the constraint conditions whose entries in the column D, which indicates validity, that are set as "T" are included in the constraint condition list 320.

Next, the IPP print service control module 315 will be described.

Figure 4:
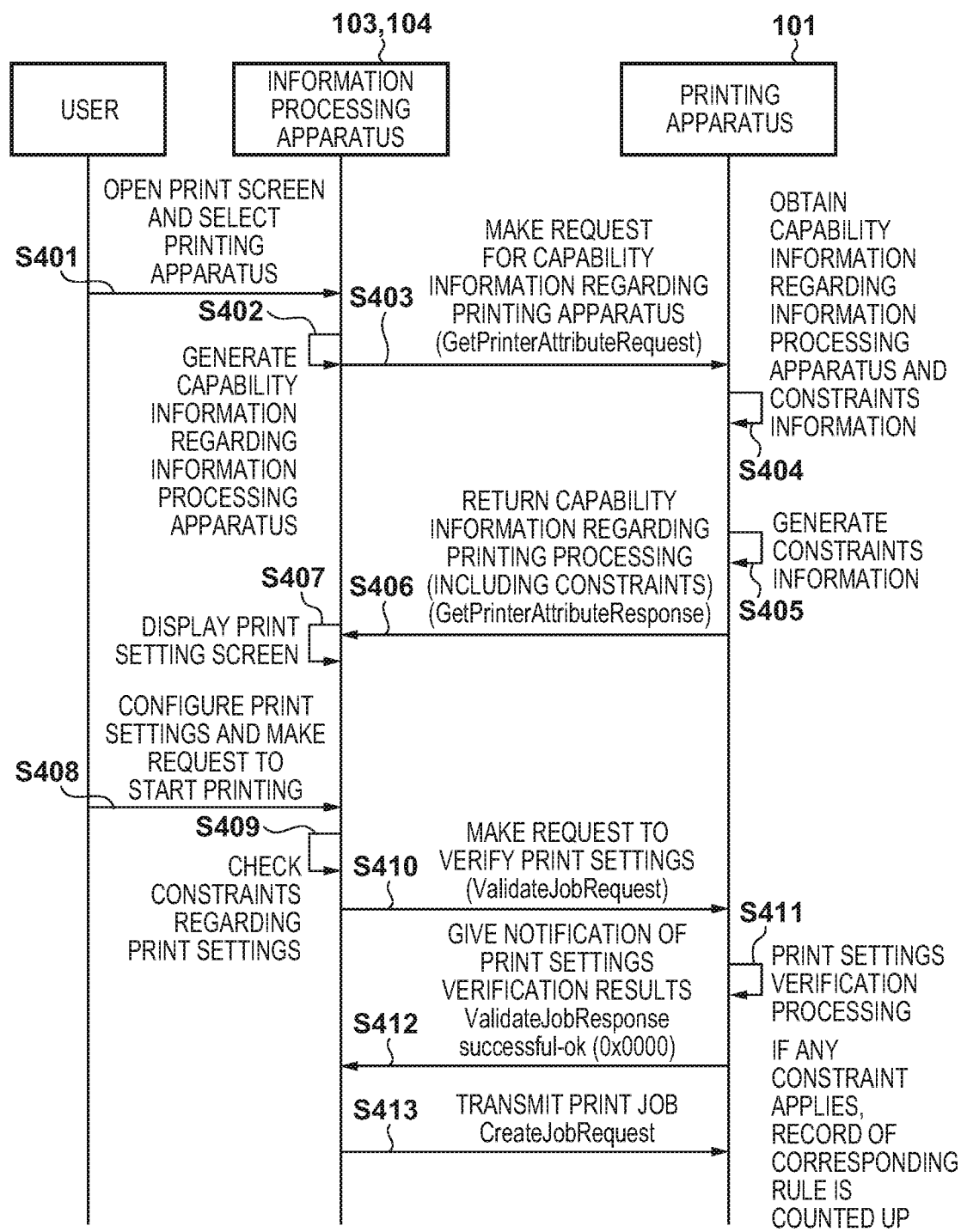
FIG. 4 is a sequence chart for describing a flow of processing performed between an information processing apparatus and the printing apparatus in the print system according to an embodiment.

The client capability obtaining module 316 is a module that holds items (604 in FIG. 6) that can be set for printing and of which the IPP print service control module 315 is notified by the information processing apparatus (S403, S404, and S405 in FIG. 4).

FIG. 6 depict a view illustrating examples of messages of an inquiry request and a response according to the embodiment.

If a notification of print setting items supported by the information processing apparatus does not match, the client identifying module 317 identifies an IPP-Client of the information processing apparatus based on UserAgent information (601 in FIG. 6) within an attribute information request (GetPrinterAttributeRequest), i.e. a request for requesting attributes of the printing apparatus issued by the information processing apparatus, and makes, to the client capability DB 318, an inquiry about print setting items supported by the IPP-Client that coincides with the identifier of the identified IPP-Client.

The client capability DB 318 is a management DB that holds print setting items supported by UserAgents of respective IPP-Clients of information processing apparatuses. A data example of the client capability DB 318 in the printing apparatus 101 is shown in FIG. 9, which has been described above.

As shown in FIG. 9, different IPP-Clients support different functions. For example, if a UserAgent is an IPP client "XXXOS Version12.3", all of the items of paper types are set as "F" and are accordingly not supported, and all of the items of paper sizes are set as "T" and are accordingly supported. Similarly, it can be understood that, as for stapling, only designation of "any position (ANY)" and "upper left position" are set as "T" and are accordingly supported, and, as for punching, "any position (ANY)" and "left" are set as "T" and are according supported, and furthermore, designation of double-sided printing is also set as "T" and is accordingly supported.

Thus, the printing apparatus 101 can understand functions supported by the information processing apparatus by referencing UserAgent information of which the printing apparatus 101 is notified by each information processing apparatus. Note that the maximum number of constraint items in the column W in FIG. 9 indicates the maximum value of the number of items (maximum number of items) in a constraint condition expression that can be dealt with by each client (information processing apparatus), and more constraint conditions than the maximum number of items cannot be dealt with. For example, even if an information processing apparatus of which the value of the maximum number of constraint items is 2 is notified of 3 or more items of the constraint information, processing by the information processing apparatus is not possible. The column X in FIG. 9 indicates whether or not a client of each information processing apparatus can update the constraint information of which the information processing apparatus has been notified by the printing apparatus 101. "T" is set if the constraint information can be updated, otherwise "F" is set. If the information processing apparatus cannot later update constraint information of which the information processing apparatus has been once notified, constraint conditions cannot be changed in accordance with the situation on the printing apparatus side. Note that constraint information regarding functions that are not supported by the information processing apparatus can be eliminated. That is to say, the aforementioned maximum number of items is an example of the capability information regarding the information processing apparatus. The maximum number of items is also an example of the attribute information regarding the information processing apparatus. Information indicating the operation system of the information processing apparatus is an example of the attribute information regarding the information processing apparatus.

The job control module 307 includes the constraints determination module 321. The constraints determination module 321 monitors set values stored in a job attribute storage module 308 and a page attribute storage module 311 in the printing apparatus 101, and verifies whether or not each parameter satisfies any of the conditions in the constraint condition DB 319. If any of the conditions in the constraint condition DB 319 is satisfied, print processing is suspended. Also, the constraint record for this constraint condition in the column B in FIGS. 8A-8C is updated, and is modified such that a notification of this record is given in response to the following and subsequent inquiries about constraint information from the information processing apparatus.

A UI control module 301 obtains information regarding the status of a print job that is being processed from the job control module 307, and displays the processing status of the print job on a UI screen. A print job generation module 302 receives a print job from the information processing apparatus via the IPP print service control module 315, writes drawing data in a data reception control module 305, registers the received job as a new job to the job control module 307, and makes a request to start print processing. Furthermore, the print job generation module 302 delivers print setting information to be applied to the print job to the job attribute storage module 308 via the job settings storing/verifying module 303.

The data reception control module 305 includes an area for buffering a print job received by the print job generation module 302, and temporarily stores each print job in the storage 214. Upon the job control module 307 instructing a PDL analyzing module 306 to perform processing to analyze PDL (Page Description Language) of the print job, the PDL analyzing module 306 makes a request for this print job to the data reception control module 305. Thus, the data reception control module 305 delivers data of this print job to the PDL analyzing module 306. The job control module 307 then instructs the PDL analyzing module 306 to analyze the print job. Regarding page data generated by the PDL analyzing module 306, a page control module 309 stores image in a page storage module 310, and stores page attribute information in the page attribute storage module 311.

The job attribute storage module 308 stores attribute information regarding print jobs. This attribute information includes "number of copies", "print side (single-sided/double-sided) settings" "finishing settings", and so on, which are set as job attributes and document attributes in IPP. The page control module 309 controls page analysis processing performed by the PDL analyzing module 306, RIP (raster image processing) processing performed by an RIP control module 313, and print control processing performed by the print control module 312. The print control module 312 obtains image data that has already been subjected to RIP from the page storage module 310, performs color separation on the image data into CMYK, and transfers the color-separated image data to the engine control module 314. The engine control module 314 receives CMYK image data, page-by-page, from the print control module 312, and controls the printing unit 220 to perform processing to print each page.

FIG. 4 is a sequence chart for describing a flow of processing performed between the information processing apparatus and the printing apparatus 101 in the print system according to the embodiment.

Initially, in step S401, the user opens a print screen from an application in the information processing apparatus, and presses a button for selecting a printing apparatus to select a target printing apparatus. Thus, in step S402, the information processing apparatus generates setting information that can be configured in this information processing apparatus in order to display a print setting screen. In step S403, the information processing apparatus makes a request for capability information regarding the selected printing apparatus to the printing apparatus 101 in order to display the capability information on the print setting screen. Thus, in step S404, the printing apparatus determines whether or not setting information regarding the information processing apparatus is included in the request from the information processing apparatus. If the setting information is not included, the printing apparatus estimates setting information that can be configured in the information processing apparatus, based on UserAgent information regarding this information processing apparatus. In step S405, the printing apparatus generates constraint information of which the printing apparatus is to notify the information processing apparatus, based on setting information related to print settings in the information processing apparatus, functions that can be provided by the printing apparatus 101, and the capability state thereof. In step S406, the printing apparatus 101 notifies the information processing apparatus of the constraint information.

In step S407, the information processing apparatus displays the print setting screen based on the capability information and the constraint information of which the information processing apparatus was notified by the printing apparatus 101. In step S408, the user configures print settings via the displayed print setting screen. At this time, in step S409, the information processing apparatus verifies constraint conditions every time a print setting is input. Thereafter, upon the user pressing the print button in the print setting screen, the processing proceeds to step S410, and the information processing apparatus transmits, to the printing apparatus 101, a verification request, i.e. a request to verify the print settings configured on the information processing apparatus.

Thus, in step S411, the printing apparatus 101 references constraint information that the printing apparatus 101 itself has, and verifies the received print settings. If there is no problem, in step S412, the printing apparatus 101 returns a response indicating OK. If the print settings fall under any of the constraint conditions, the printing apparatus 101 updates the constraint condition DB 319 shown in FIGS. 8A-8C, and returns, in step S412, a response indicating that printing cannot be performed. In this case, the information processing apparatus prompts the user to reconfigure the settings. If the verification result from the printing apparatus 101 in step S412 is "OK", in step S413, the information processing apparatus transmits a print job to the printing apparatus 101.

Figure 5A:
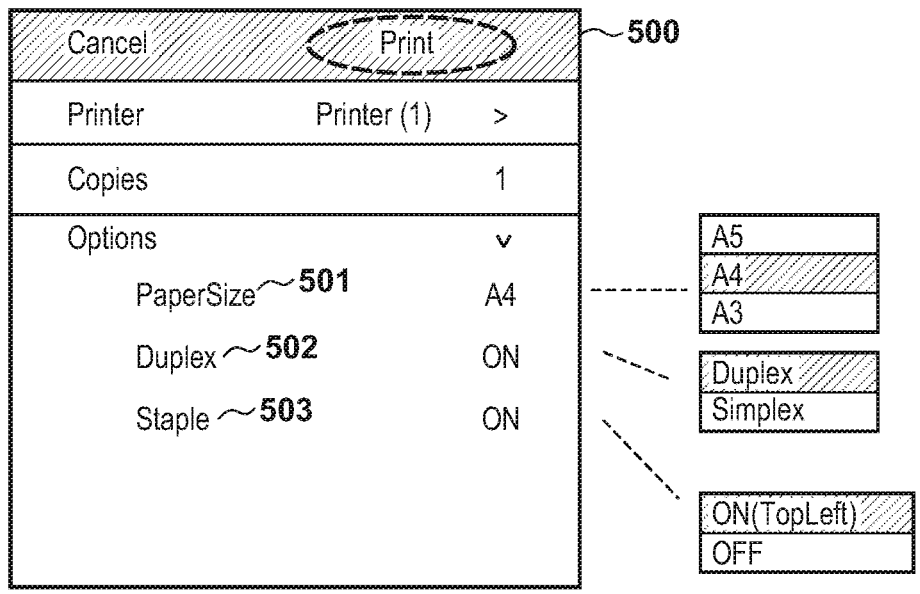
FIGS. 5A and 5B depict views illustrating examples of print setting screens displayed on information processing apparatuses according to an embodiment.
Figure 5B:
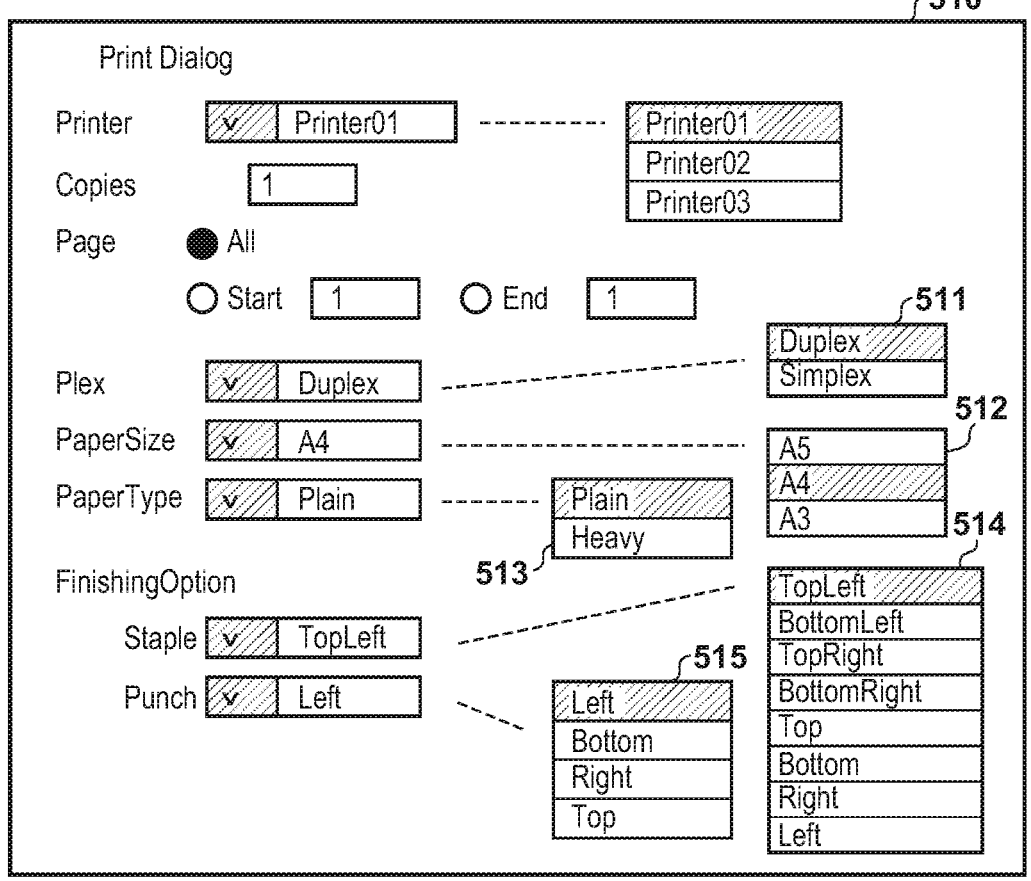
Figure 13A:
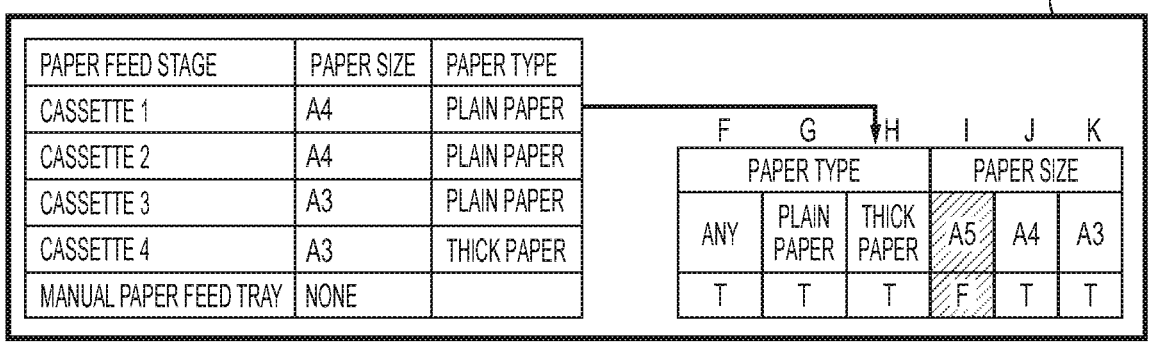

FIGS. 5A and 5B depict views illustrating examples of print setting screens displayed on the information processing apparatuses according to the embodiment.

A UI screen 500 in FIG. 5A shows an example of a print setting screen for smartphones and tablets, for example, and a UI screen 510 in FIG. 5B shows an example of a print setting screen for mobile PCs, for example.

The print setting screen for smartphones in FIG. 5A only supports a paper size setting 501, a double-sided printing setting 502, and a stapling setting 503. Here, the paper size setting 501 supports three sizes, namely A5, A4, and A3, and the staple setting supports whether or not to perform stapling, and if stapling is to be performed, only a setting of stapling at the upper left side is supported. This corresponds to a UI screen of a print client with UserAgent information "XXXOS Version11.0" in FIG. 9.

Meanwhile, the print screen 510 for mobile PCs in FIG. 5B supports not only a double-sided printing setting 511 and a paper size setting 512, but also a paper type setting 513, a stapling position setting 514, and a punching position setting 515. This corresponds to a UI screen of a print client with UserAgent information "ZZZOS Version7.0" in FIG. 9.

Thus, different print setting items can be set by different types of information processing apparatuses.

FIG. 6 depicts a view illustrating examples of messages in IPP communication that is exchanged between the information processing apparatus and the printing apparatus 101 according to the embodiment.

A message 600 is an example of a message with which the information processing apparatus makes an inquiry about print capabilities to the printing apparatus 101 and notifies the printing apparatus 101 of setting information that can be configured in the information processing apparatus. This message includes header information regarding an HTTP layer and an IPP message data on HTTP. Reference numeral 601 denotes UserAgent information set by the IPP-Client of the information processing apparatus. This value is used by the client identifying module 317 in the printing apparatus 101 to reference the client capability DB 318 (FIG. 9). Reference numeral 602 denotes information illustrating setting information regarding the print setting screen that the information processing apparatus has. Reference numeral 603 denotes the maximum value that can be dealt with in a multi-variant expression for expressing a constraint condition. The maximum value in this example is 2, and it can thus be understood that a multi-variant expression with up to two items can be dealt with. 604 denotes print items that can be displayed on the print setting screen of the information processing apparatus. Specifically, it is indicated that, in the print setting screen, the print size can be selected from among A5, A4, and A3, the double-sided printing setting can be selected from one-sided, double-sided (long-edge binding) and double-sided (short-edge binding), stapling is available as finishing, and only the upper left position or any position can be designated as the stapling position. This corresponds to functions supported by the information processing apparatus with UserAgent "XXXOS Version11.0" in FIG. 9. 605 indicates that constraint information regarding the printing apparatus is requested.

A message 610 is an example of constraint information of which the printing apparatus 101 notifies the information processing apparatus, in response to the message 600. Reference numeral 611 denotes constraint information of which the printing apparatus 101 is to notify the information processing apparatus, and a plurality of constraint conditions are listed therein. Reference numeral 612 denotes an example of a constraint condition, and indicates that double-sided printing on A5 paper is prohibited. This corresponds to the constraint rule with the management number 1 in FIGS. 8A-8C.

FIG. 7 is a flowchart for describing processing by which the printing apparatus 101 according to the embodiment registers or deletes constraint information to or from the constraint condition list 320 based on constraint information registered in the constraint condition DB 319 and setting information regarding the information processing apparatus. Note that this processing is achieved by the CPU 211 executing a program deployed to the RAM 213. The timing at which the processing illustrated by this flowchart starts is step S403 in the sequence in FIG. 4. Also, this processing is executed by the CPU 211 functioning as the IPP print service control module 315 and referencing the constraint condition DB 319.

Initially, in step S701, the CPU 211 develops all constraint conditions registered in the constraint condition DB 319 to the RAM 213. Next, the processing proceeds to step S702, and the CPU 211 determines whether or not the printing apparatus 101 is able to receive setting information that can be configured in the information processing apparatus, based on the request of which the information processing apparatus has notified the printing apparatus 101 in step S403 in FIG. 4. If it is determined here that the printing apparatus 101 is able to receive the setting information that can be configured in the information processing apparatus, the processing proceeds to step S703, and if not, the processing proceeds to step S704.

In step S703, the CPU 211 narrows down the constraint condition list 320 by eliminating constraint conditions that include unsettable functions, i.e. functions other than the functions that can be set in the information processing apparatus, based on the settable information of which the printing apparatus 101 has been notified by the information processing apparatus, and the processing proceeds to step S706. That is to say, here, the information processing apparatus does not need to be notified of constraint information regarding the functions that cannot be set in the information processing apparatus, and thus, constraint information regarding the unsettable functions is excluded to narrow down the constraint conditions.

The details of this processing are illustrated in FIGS. 11A-11D.

FIGS. 11A-11D depict views illustrating examples of narrowing down the constraint information in the constraint condition DB 319 in FIGS. 8A-8C based on the received information that can be configured in the information processing apparatus.

Reference numeral 1101 denotes, with "T" or "F", whether or not each attribute is supported in the print setting screen, based on settable information 604 received from the information processing apparatus. If "F" appears in a function column within a thick frame, the corresponding function is not supported by the information processing apparatus, and accordingly, an instruction regarding this function is not issued in the print setting screen. That is to say, a constraint condition that depends on a column (function) for which "F" is set is not valid. After "F" is set column-by-column, whether or not constraint conditions are valid is determined row-by-row. In the constraint information 1102, an AND operation of constituent elements of the constraint conditions F to Z is performed, and the results are stored in the column D. Only in the case where "T" appears in the column D, which indicates validity, a corresponding constraint condition is valid, and thus the constraint condition list is created. Thus, even if identification information regarding a client cannot be obtained, constraint information can be narrowed down in accordance with the settable information regarding the client.

On the other hand, in step S704, the CPU 211 searches the column A in FIG. 9 to determine whether or not UserAgent information included in the request in step S403 in FIG. 4 is registered in the client capability DB 318. If registered, print setting functions is able to be estimated using information in the columns B to V in FIG. 9, and the processing proceeds to step S705. In step S705, the CPU 211 obtains corresponding print setting functions from the UserAgent information registered in the client capability DB 318, and eliminates constraint conditions associated with unsupported functions to narrow down the constraint condition list 320. The details of this processing are illustrated in FIGS. 10A-10D.

FIGS. 10A-10D depict views illustrating examples of narrowing down the constraint information in the constraint condition DB 319 in FIGS. 8A-8C based on UserAgent information.

Whether or not each of the attributes derived based on UserAgent information 601 is supported in the print setting screen is indicated with "T" or "F" within a thick frame 1001 in FIGS. 10A-10D. If "F" appears in a function column within a thick frame, a corresponding function is not supported in the print setting screen of the information processing apparatus, and accordingly, an instruction regarding this function is not issued. That is to say, a constraint condition that depends on a column (function) for which "F" is set is not valid. After "F" is set column-by-column, whether or not constraint conditions are valid is determined row-by-row. In constraint information 1002, an AND operation of the constituent elements of constraint conditions F to Z is performed, the results are stored in the column D, and the processing proceeds to step S706. Only in the case where "T" appears in the column D, which indicates validity, a corresponding constraint condition is valid, and thus the constraint condition list is created. Thus, if identification information regarding a client can be obtained, even when capability information regarding this client cannot be obtained, constraint information is able to be narrowed down in accordance with the information that can be configured in the client.

In step S706, the CPU 211 checks the maximum number of items in a constraint multi-variant expression that can be interpreted by the information processing apparatus. Specifically, either the upper limit value of the multi-variant expression (603 in FIG. 6) obtained through a notification from the information processing apparatus or the upper value (column W in FIG. 9) estimated based on the UserAgent is compared with the number of items in a multi-variant expression for each of the constraint conditions listed in the column C in FIGS. 8A-8C. Constraint information that cannot be dealt with by the information processing apparatus is thus excluded. An example is shown in FIGS. 12A-12C.

FIGS. 12A-12C depict views illustrating examples of narrowing down constraint information when the UserAgent of the information processing apparatus is "YYYOSVersion5.0".

A notification has been made indicating that the maximum number of items of each constraint condition that can be dealt with by the information processing apparatus with UserAgent "YYYOSVersion5.0" is 2, and the pieces of constraint information with No. 26 and No. 27 in which the number of items for the respective registered constraint condition expressions is greater than 2 are excluded from the column C in FIGS. 8A-8C.

Next, the processing proceeds to step S707, and the CPU 211 determines whether or not the information processing apparatus is able to update the constraint information as required upon being notified by the printing apparatus 101. As a method of this determination, information in the column X (updating of constraint information in FIG. 9) in the client capability DB 318 is referenced based on User-Agent information regarding the information processing apparatus, or a notification from the information processing apparatus denoted by a reference numeral 606 in FIG. 6 is referenced. If it is determined that the information processing apparatus can update constraint information as required, the constraint conditions are dynamically applied in accordance with a use status of the printing apparatus 101, and this processing ends.

On the other hand, if it is determined that the information processing apparatus cannot update constraint information, processing to reduce constraint conditions in steps S708, S709, and S710 is performed. In step S708, the CPU 211 eliminates constraint conditions associated with information regarding paper that is not set in the printing apparatus 101 to narrow down the constraint conditions registered in the constraint condition list 320. An example is shown in FIGS. 13A-13D.

FIGS. 13A-13D depict views illustrating examples of eliminating the constraint conditions associated with information regarding paper that is not set in the printing apparatus 101, based on the paper type and the paper size that are set for paper feed stages in the printing apparatus 101.

In FIGS. 13A-13D, in an area 1301, whether or not each of the paper types and the paper sizes is available is reflected, with "T" or "F" in the columns F to K in the constraint condition list 320, based on the paper types and the paper sizes that are derived from information regarding the paper feed stages in the printing apparatus 101. Here, the paper size "A5" is not set, and accordingly "F" is entered in the column I indicating "A5 size". After "F" is set column-by-column, whether or not constraint conditions are valid is determined row-by-row. If an AND operation of constituent elements of the constraint conditions in the columns F to Z is performed, all of the constraint conditions associated with the A5 size, which is not set for any paper feed stage, are invalid. Accordingly, in the example in FIGS. 13A-13D, only the constraint information with the management numbers 2 and 17 to 29 is valid.

Next, the processing proceeds to step S709, and the CPU 211 narrows down the constraint conditions registered in the constraint condition list 320 in accordance with the counter values in FIGS. 8A-8C. An example is shown in FIGS. 14A-14D.

FIGS. 14A-14D depict views illustrating examples of narrowing down the constraint conditions based on usage records of the print functions of the printing apparatus 101.

Counter values that the constraint condition DB 319 in FIGS. 8A-8C has are shown in an area 1401 in FIGS. 14A-14D. These counters are to be counted by the print control module 312 when a recorded sheet is discharged, and indicate the number of times that the respective functions have been used. Priority according to which constraint conditions are provided is decreased for functions that are not used. Here, in the state shown in FIGS. 13A-13D, "F" is further set for the columns L, O, P, S, T, U, X, and Y, the counter value of which is "0", and the state shown in FIGS. 14A-14D is entered. Thereafter, whether or not the constraint conditions are valid is determined row-by-row. As a result, constraint conditions regarding functions that are not frequently used by the user (i.e. functions whose counter value is smaller than a predetermined value) can be eliminated.

Next, the processing proceeds to step S710, and the CPU 211 eliminates constraint conditions with no operation record to narrow down the constraint conditions registered in the constraint condition list 320, using the constraint records in the column B in FIGS. 8A-8C. This example is shown in FIGS. 15A-15C.

FIGS. 15A-15C depict views illustrating examples of narrowing down the constraint conditions based on the records of the constraint conditions.

Values of constraint records that the constraint condition DB 319 has appear in the column B denoted by a thick frame 1500 in FIGS. 15A-15C. These constraint records are incremented in the case of an error, as a result of the IPP print service control module 315 making an inquiry to the constraint condition DB 319 during setting verification processing in step S411 in a print sequence. The constraint records are also incremented in the case of an error, as a result of the constraints determination module 321 in the job control module 307 making an inquiry to the constraint condition DB 319 during control performed after printing has started. That is to say, constraint conditions for which the constraint record has been incremented (i.e. is not 0) are a combination of settings that are often used by the user and that constraints processing needs to be performed. On the contrary, constraint conditions for which the record count is 0 are settings that are hardly combined by the user. Here, "F" is set for the constraint conditions with no usage records with the management numbers 1 to 25 and 29, and thus the constraint conditions can be narrowed down to three.

As described above, according to the embodiment, the printing apparatus narrows down constraint information that the printing apparatus has, based on print setting information regarding the information processing apparatus and capability information regarding the printing apparatus, and transmits only the minimum necessary constraint conditions to the information processing apparatus. As a result, the data volume of constraint information to be transmitted from the printing apparatus to the information processing apparatus can be reduced without impairing the convenience regarding constraints processing to the user.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060742, filed Mar. 27, 2018, which is hereby incorporated by reference herein in its entirety.

What is claimed is:

1. A printing apparatus comprising:
one or more memories configured to store a plurality of combinations of print settings that conflict with each other;
one or more processors are configured to:
receive a request for combinations of print settings that conflict with each other and information related to an information processing apparatus from the information processing apparatus;
notify the information processing apparatus of one or more combinations obtained by narrowing down, based on the received information, the stored plurality of combinations of print settings that conflict with each other;
receive print settings from the information processing apparatus; and
determine whether or not the received print settings include print settings that conflict with each other, based on at least one combination that is combinations stored in the one or more memories and different from the notified one or more combinations.

2. The printing apparatus according to claim 1,
wherein the notified one or more combinations are combinations in which a number of print settings is less than a threshold among the stored plurality of combinations of print settings that conflict with each other.

3. The printing apparatus according to claim 1, wherein the one or more processors count a number of times that it is determined that a first combination of the stored plurality of combination of print settings conflict with each other is included in the received print settings and notify the information processing apparatus of the first combination in accordance with the counted number of times is greater than a threshold.

4. The printing apparatus according to claim 1, further comprising:
a paper feed unit that contains papers and feeds a paper, wherein the one or more processors further notify the information processing apparatus of a combination of print settings obtained by narrowing down the stored plurality of combinations of print settings that conflict with each other with information regarding the paper contained in the paper feed unit.

5. The printing apparatus according to claim 4, wherein the information regarding the paper includes at least one of a paper type and a paper size.

6. The printing apparatus according to claim 1, wherein the one or more processors further notify the information processing apparatus of a combination of print settings obtained by narrowing down the plurality of combinations of print settings that conflict with each other in accordance with a function of a device connected to the printing apparatus.

7. The printing apparatus according to claim 6, wherein the device includes a finisher or a paper feeder.

8. The printing apparatus according to claim 1, wherein the print settings are received from the information processing apparatus after the one or more combinations obtained by narrowing down the stored plurality of combinations of print settings that conflict with each other are notified to the information processing apparatus.

9. The printing apparatus according to claim 1, wherein the one or more processors receive the print settings that are determined, by the information processing apparatus, not to include the notified one or more combinations obtained by narrowing down the stored plurality of combinations of print settings.

10. The printing apparatus according to claim 1, wherein the one or more processors determine whether or not the received print settings include print settings that conflict with each other, based on at least one combination that is stored in the one or more memories and different from any one of the notified one or more combinations.

11. A method of controlling a printing apparatus having one or more memories that store a plurality of combinations of print settings that conflict with each other, the method comprising:
receiving a request for combinations of print settings that conflict with each other and information related to an information processing apparatus from the information processing apparatus;
notifying the information processing apparatus of one or more combinations obtained by narrowing down, based on the received information, the stored plurality of combinations of print settings that conflict with each other;
receive print settings from the information processing apparatus; and
determine whether or not the received print settings include print settings that conflict with each other, based on at least one combination that is stored in the one or more memories and different from the notified one or more combinations.

12. A non-transitory computer readable storage medium storing a program for causing a processor to execute a method of controlling a printing apparatus having one or more memories that store a plurality of combinations of print settings that conflict with each other, the method comprising:
receiving a request for combinations of print settings that conflict with each other and information related to an information processing apparatus from the information processing apparatus;
notifying the information processing apparatus of one or more combinations obtained by narrowing down, based on the received information, the stored plurality of combinations of print settings that conflict with each other;
receive print settings from the information processing apparatus; and
determine whether or not the received print settings include print settings that conflict with each other, based on at least one combination that is stored in the one or more memories and different from the notified one or more combinations.

13. A printing apparatus comprising:
one or more memories configured to store a plurality of combinations of print settings that conflict with each other;
one or more processors configured to:
receive a request for combinations of print settings that conflict with each other from the information processing apparatus;
notify the information processing apparatus of a part of the stored plurality of combinations of print settings that conflict with each other;
receive print settings from the information processing apparatus; and
determine whether or not the received print settings include print settings that conflict with each other, based on at least one combination that is stored in the one or more memories and different from the notified part of the plurality of combinations of print settings that conflict with each other.

14. The printing apparatus according to claim 13, wherein the print settings are received from the information processing apparatus after the part of the stored plurality of combinations of print settings that conflict with each other is notified to the information processing apparatus.

15. The printing apparatus according to claim 13, wherein the one or more processors receive the print settings that are determined, by the information processing apparatus, not to include the notified part of the stored plurality of combinations of print settings.

16. The printing apparatus according to claim 13, wherein the one or more processors receive information of the information processing apparatus from the information processing apparatus, specify the part of the stored plurality of combinations of print settings based on the received information, and transmit the specified part of the stored plurality of combinations of print settings to the information processing apparatus.

17. The printing apparatus according to claim 16, wherein the information is information related to a user agent.

18. The printing apparatus according to claim 13, wherein the notified part of the stored plurality of combinations of print settings is used for displaying a print setting screen by the information processing apparatus.

19. The printing apparatus according to claim 18, wherein the received print settings do not include print settings that match the notified part of the stored plurality of combinations of print settings.

* * * * *